(12) United States Patent
Smith et al.

(10) Patent No.: US 10,984,410 B2
(45) Date of Patent: Apr. 20, 2021

(54) ENTITY-SOVEREIGN DATA WALLETS USING DISTRIBUTED LEDGER TECHNOLOGY

(71) Applicant: Adobe Inc, San Jose, CA (US)

(72) Inventors: Kevin Gary Smith, Lehi, UT (US); John Bevil Bates, Highland, UT (US)

(73) Assignee: ADOBE INC., San Jose, CA (US)

( * ) Notice: Subject to any disclaimer, the term of this patent is extended or adjusted under 35 U.S.C. 154(b) by 258 days.

(21) Appl. No.: 16/192,743

(22) Filed: Nov. 15, 2018

(65) Prior Publication Data

US 2020/0160319 A1    May 21, 2020

(51) Int. Cl.
| | |
|---|---|
| *G06Q 20/36* | (2012.01) |
| *H04L 29/06* | (2006.01) |
| *H04L 9/06* | (2006.01) |
| *H04L 9/32* | (2006.01) |

(52) U.S. Cl.
CPC .......... *G06Q 20/36* (2013.01); *H04L 9/0637* (2013.01); *H04L 9/3221* (2013.01); *H04L 9/3247* (2013.01); *H04L 63/10* (2013.01)

(58) Field of Classification Search
CPC ..... G06Q 20/36; H04L 9/0637; H04L 9/3247; H04L 9/3221
See application file for complete search history.

(56) References Cited

U.S. PATENT DOCUMENTS

| | | | | |
|---|---|---|---|---|
| 10,402,829 B1 * | 9/2019 | Baar | .................... | G06Q 20/227 |
| 10,735,193 B1 * | 8/2020 | Knas | ..................... | H04L 9/0861 |
| 2017/0132630 A1 * | 5/2017 | Castinado | ............ | G06Q 20/382 |
| 2019/0036887 A1 * | 1/2019 | Miller | ..................... | G06F 21/62 |
| 2019/0087892 A1 * | 3/2019 | Pinski | .................. | G06Q 20/108 |
| 2019/0188411 A1 * | 6/2019 | Kroutik | .................. | H04L 63/10 |
| 2019/0205563 A1 * | 7/2019 | Gonzales, Jr. | ........ | H04L 9/3297 |
| 2019/0370866 A1 * | 12/2019 | Lawbaugh | ............ | H04L 9/0637 |
| 2020/0076615 A1 * | 3/2020 | Redpath | ................ | H04L 9/3218 |

FOREIGN PATENT DOCUMENTS

WO    WO-2017090041 A1 *    6/2017    ........... H04L 9/0825

OTHER PUBLICATIONS

Data Transfer Project Overview and Fundamentals. (Jul. 20, 2018). Retrieved from the Internet Jan. 15, 2019 at <https://datatransferproject.dev/>. 25 pages.

* cited by examiner

*Primary Examiner* — Vance M Little
(74) *Attorney, Agent, or Firm* — Shook, Hardy & Bacon L.L.P.

(57) ABSTRACT

In various embodiments, a request is received for a claim that is responsive to an interrogatory, where the interrogatory uses values of items of interest regarding a subject user to produce the claim. Based on the request, it is determined that one or more permissions, included in one or more digitally signed transactions of one or more transaction blocks on one or more copies of a blockchain maintained at least in part by nodes of a distributed ledger system, represents the subject user granting a receiving entity with a right to receive claims that are responsive to interrogatories that use the values to produce the claims. Based on the determining, the receiving entity is granted access to the claim.

20 Claims, 9 Drawing Sheets

ENTITY-SOVEREIGN DATA WALLETS USING DISTRIBUTED LEDGER TECHNOLOGY

BACKGROUND

Different entities often employ information, or data, regarding other entities (e.g., users) for various applications, such as software and services tailored to the entities. Lack of a particular type of information for an application or the use of low quality information (e.g., inaccurate, outdated, or invalid) can result in the application making erroneous or unreliable determinations. Some entities may be better adapted to collect certain types of entity information than others, such that the quality of the information available for applications varies across the entities. For example, for an individual's age, one entity may rely on a birth certificate to verify the individual's age, whereas another may rely solely on user input, and still another entity may infer the individuals age based on user interactions with a website.

An entity (e.g., user) is typically best positioned to provide accurate information regarding the entity. However, due to factors such as privacy and security concerns, entities often refrain from providing the information, or provide inaccurate information to bypass information requests. Typically, once a user shares information (e.g., the user's age) with another entity, the data is out of the user's control. The receiving entity may maintain the information in a user profile to use for various purposes, even after the user wishes to sever ties with the entity. Further, entity information regarding the same entity typically remains siloed amongst entities with each maintaining its own user profile. A security breach to any one entity system allows for unauthorized access to personal information. Further, a user may wish to provide data from one entity to another entity so the new entity can use the user's data. However, the entity may refuse to share the data or there may be incompatibilities between entity systems.

SUMMARY

Embodiments of the present disclosure relate to entity-sovereign data wallets using distributed ledger technology. Systems and methods are disclosed related to distributed ledger-based systems and methods allowing an entity to share information regarding the entity with other entities while maintaining sovereignty over the data and alleviating privacy and security concerns.

In some embodiments, a distributed ledger, such as a blockchain, is used to maintain records of permissions granted by a user (or more generally an entity) to other entities regarding use of user information of the user. The user may grant permissions on an entity-specific basis and an item of interest (e.g., data point) and/or set or group of items-specific basis. When an entity requests data regarding user information, the permissions may be analyzed on the distributed ledger to enforce the permissions and allow or deny access to the requested information accordingly. Thus, the user maintains control, or sovereignty, over the data, and different entities may access the data from the same repository, which may be encrypted on the distributed ledger and/or at an external source. Further, in various embodiments, specific values of items of user information are not provided to requesting entities. Instead, claims (e.g., factual statements, such as true or false statements) are provided to the entities without revealing the underlying values. A claim may be an answer to an interrogatory (e.g., asked by an entity) and the claim may be determined using the values for multiple items of interest. Instead of the entity application directly receiving specific values, more generalized information may be used as input by an entity application. Thus, specific values of items of user information may remain private and secure while still being used to power entity applications.

BRIEF DESCRIPTION OF THE DRAWINGS

The present invention is described in detail below with reference to the attached drawing figures, wherein.

DETAILED DESCRIPTION

Figure 1:
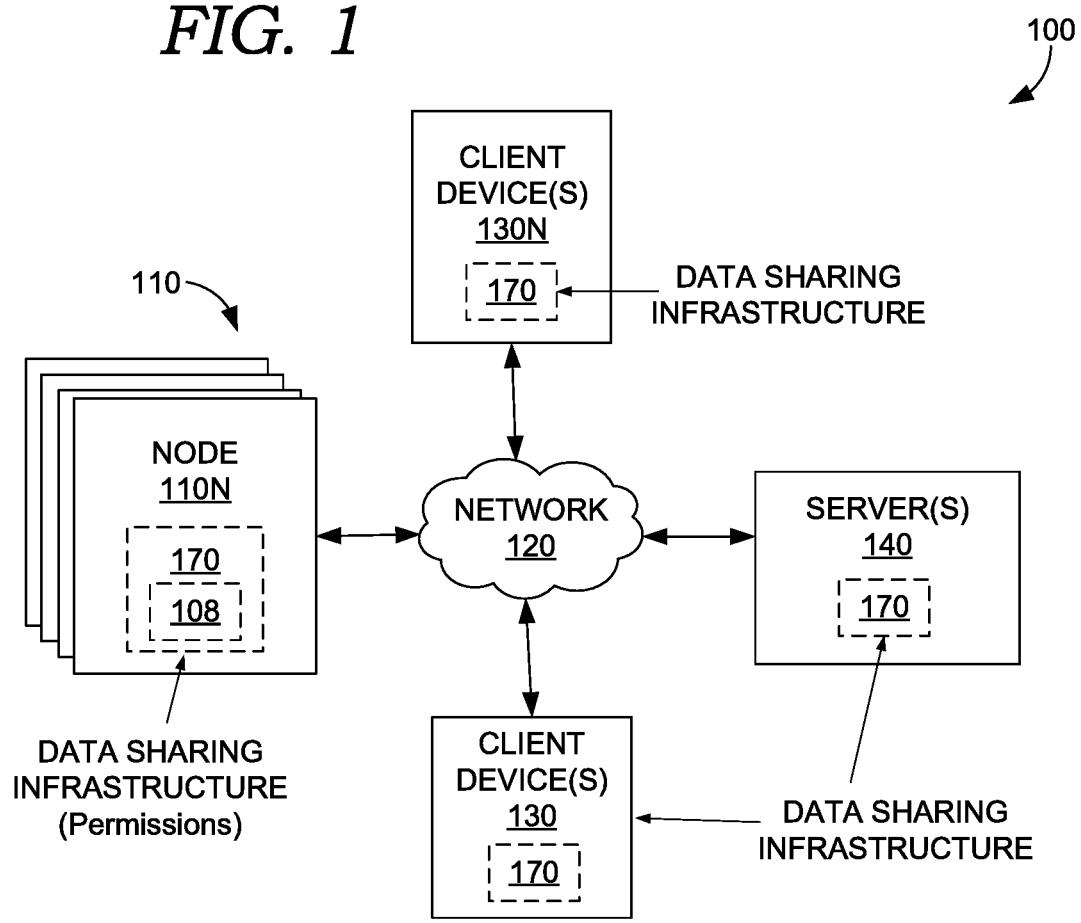
FIG. 1 is an example system diagram of a data sharing system in accordance with some embodiments of the present disclosure.

An entity (e.g., user) is typically best positioned to provide accurate information regarding the entity. However, due to factors such as privacy and security concerns, entities often refrain from providing the information, or provide inaccurate information when possible to bypass information requests. This results in large quantities of computer storage being consumed by low quality and/or redundant data, and entities may rely on incomplete or low quality data sets for their applications.

Typically, once a user shares information (e.g., the user's age) with another entity, the data is out of the user's control. The receiving entity may persistently maintain the information in a user profile and use the user profile, even after the user wishes to sever ties with the entity. Further, entity information regarding the same entity typically remains siloed amongst entities with each maintaining its own user profile. A security breach to any one entity system allows for unauthorized access to personal information. Further, a user may wish to provide data from one entity to another entity so the new entity can use the user's data. However, the entity may refuse to share the data or there may be incompatibilities between entity systems.

As an example, a user may be on the Internet using a browser and reach a website that requests the user's personal information. Due to lack of trust in the entity running the website, the user may enter false information to bypass the request and continue using the website. The website may incorporate the erroneous user information into a user profile and/or present improper content to the user based on the information. As another example, the website may be designed with limited functionality to account for the low quality of the data.

Thus, information provided by a user, or entity, regarding the user can often be unreliable. Some entities may still request information from users and in some cases rely on incomplete or low quality data sets for their applications. Further, entities may devote computing resources to algorithms attempting to infer user information, such as based on user interactions with a website.

Some entities may attempt to obtain user information from other entities. However, the data typically remains siloed amongst the entities. This is due, in part, to the competitive advantage of building up a reliable dataset regarding entities over time and maintaining exclusive control over that data. To illustrate the forgoing, a user may be a customer of an airline, and may have used that airline for many years. Over that time the airline may have collected significant amounts of data on the user through the user's flights and related user interactions with the airline's website and services, including many opportunities to validate previously received or inferred user information. Thus, the airline may offer applications and services that rely on more complete and accurate information regarding the user compared to another airline, which the user has never used. Were the user to switch to the other airline, the applications and services may be impaired, at least until the airline is able to build up a robust user profile for the user. This process may require significant computing resources, and may be redundant with processes performed by the previous airline to achieve a similar profile.

In the forgoing example, a user may wish to switch airlines for various reasons, such as a breach of the user's trust. As the original airline has control over the user's information, the airline may be unwilling or unable to provide the user information to the new airline, diminishing the quality of the new airline's services. For example, the original airline may wish to retain its competitive advantage. Also, the user information may be in a format that is incompatible with the new airline, or infrastructure may not exist to export much of the data. Further, the original airline may retain the user's information, and use it as it sees fit, despite the user's wishes to terminate all associations with the entity.

Systems and methods are disclosed related to distributed ledger-based systems and methods allowing for an entity to share data with other entities privately and securely while maintaining control over the data. Generally, a distributed ledger is used to maintain records of permissions granted by a user (or more generally an entity) to other entities regarding use of user information. When an entity requests data regarding user information, the permissions may be analyzed on the distributed ledger to enforce the permissions and allow or deny access to the requested information accordingly. Rather than providing the user information in response to a request, a claim, or factual statement regarding the user information may be provided without revealing the underlying values. Using approaches described herein, various barriers to the sharing of data between entities may be alleviated, such that less data remains siloed amongst the entities and more data is shared there between. This may reduce the amount of computer storage consumed by low quality and/or redundant data and entities may rely on more complete and high quality data sets for their applications.

Various terms are used throughout, some of which are described below:

An "entity" may refer to a user and/or a legal entity, such as an association, corporation, partnership, proprietorship, trust, or individual. An "entity" additionally or alternatively may refer to a digital identify, such as a digital account (e.g., a user account), which may be assessed by one or more legal entities.

A "subject entity" may refer to an entity that information used to respond to a request for data pertains. For example, where a subject entity is a user, the information may include personal information of the user, such as demographic information, healthcare information, and the like. It is noted a request may pertain to any number of subject entities.

A "requesting entity" may refer to an entity that initiates a request for data and/or an entity that is to receive the data in response to the request. Any number of entities may receive the data in response to the request. Further, an entity initiating a request may be different from or the same as an entity receiving a response to the request.

An "item of interest" or "item of information" may refer to a particular type of information, such as a data element or object (e.g., a data field) of a schema, a common information model, or standard data model, which may assume different values. For example, an item of interest may represent a user's city of residence and for one user the value may be "San Jose," and for another user the value may be "Alexandria."

"Permissions," or "access rights," may refer to parameters that control abilities of entities to interact with data, such as entity information. Where an entity attempts to cause an action with respect to the data, the permissions may be checked to verify whether the entity has the appropriate abilities in order to either allow or deny the action. An "owner" of the data may refer to a class of entity having an ability to define permissions of other entities with respect to the data. For example, a subject entity may be an owner of entity information regarding the subject entity.

A "level of abstractness" of data may refer to a relative degree of abstractness or generally of one of a plurality of variations of the data to at least one other variation of the data. A variation with a higher level of abstractness is more general than a variation with a lower level of abstractness. Further, a variation with a higher level of abstractness may encompass at least one data point or value encompassed by a variation with a lower level of abstractness, and also encompass at least one additional data point or value that is not encompassed by the variation with the lower level of abstractness. For example, for data corresponding to a user's residence, the higher level of abstractness variation could be the user's state of residence, and the lower level of abstractness variation could be the user's city of residence. Generally, a variation having a lower level of abstractness may be used to derive a variation having a higher level of abstractness (but not the reverse).

An "interrogatory" may refer to a question that a requesting party may pose regarding at least one subject entity. For example, an interrogatory may be with regard to one or more items of interest about a subject entity. To produce an answer (e.g., a claim, or factual statement) to an interrogatory, a system may analyze values of the items of interest that describe the subject entity. A claim may be used as an answer to an interrogatory. As used herein, a "claim" may refer to a statement of fact, such as a true or false statement that is responsive to an interrogatory.

For example, given an interrogatory that asks if the subject entity is over the age of 12, a claim returned to a requesting entity may be "true" if the subject entity is 25 years old, "false" if the subject entity is 11 years old, and "unknown" if the age of the subject entity is not known (e.g., the system does not have the user information or the requestor is not permitted to receive claims regarding the information). A claim regarding a subject entity may be determined using a value of an item of interest regarding the subject entity (e.g., the entity's age in this example). In some embodiments, an interrogatory may be in the form of one or more logical expressions (e.g., Boolean expressions) that involve the items of interest as variables. A claim for the interrogatory may be a result of evaluating the one or more logical expressions by applying values to the variables. For example, the system may apply values of the items regarding a subject entity to each logical expression to produce the claim. In the above example, a logical expression may be (for Entity A, is Age>12). Age may identify the item of interest as a variable and Entity A may identify the subject entity. To produce the claim, the system may determine a value of "Age" for Entity A, substitute "Age" in the logical expression with the value, and evaluate whether the logical expression is true or false. The result of the evaluation may be provided to the requesting entity without revealing the actual age of the subject entity.

Embodiments of the present disclosure provide, at least in part, for allowing entities to request data regarding items of interest of a subject entity, and receive the data in response. The data may include or be based on a set of values of the items that are provided by (e.g., owned by) the subject entity (e.g., a user). The requests may be allowed or denied based on permissions granted by the subject entity to the entities. For example, a distributed ledger, such as a blockchain, may be used to maintain records of the permissions granted by a user (or more generally an entity) to other entities regarding use of user information.

The user may grant permissions on an entity specific basis and an item of interest (e.g., data point) and/or set or group of items specific basis. When an entity requests data regarding user information, the permissions may be analyzed on the distributed ledger to enforce the permissions and allow or deny access to the requested information accordingly. Thus, the user maintains control, or sovereignty, over the data, and different entities may access the data from the same repository, which may be encrypted on the distributed ledger and/or at an external source. As such, the user will be more willing to share their data, allowing entities to rely on more complete and high quality data sets for their applications. Further, the entities need not maintain separate user profiles, or may rely upon simplified profiles, reducing the amount of computer storage consumed by low quality and/or redundant data.

Using this approach, if a user (or more generally an entity) wishes to revoke another entity's access to the user's information, the user may update the permissions associated with the entity. Further, if the user wishes to provide another entity with access to the user's information, the user may provide permissions granting access to the entity. By doing so on an item of interest (e.g., data point) and/or set or group of items specific basis, privacy and security can further be enhanced by preventing use of information that is not needed by another entity and/or that the user does not wish to provide to the other entity.

Further, in various embodiments, privacy and security is further enhanced as specific values of items of user information need not be provided to requesting entities. Instead, at least some permissions may involve claims (e.g., true or false statements) being provided to the entities, where the claims are responsive to interrogatories that use the values for multiple items to produce the claims. Additionally or alternatively, the user may grant permissions for data to an entity at a particular level of abstractness, such as to specify the generality of information used for responses. Using these approaches, specific values of items of user information may remain private and secure while still being used to power entity applications.

Additionally requests by entities and responses to entity may be recorded, for example, on the distributed ledger. Using this approach, data can be shared between entities in a transparent manner, while creating a substantially immutable and auditable record for a request describing entities and the items of interest shared between entities, as well as any offered and/or provided compensation for the information. Also using this approach, data may be shared and/or recorded on a per request basis, such as for a particular use of the data in ad hoc and discrete manner that further enhances the sharing entity's control and security of its overall data.

In some embodiments, a user may use a user interface, such as a graphical user interface (GUI) to provide entity information regarding the entity to be used for values for items of interest to respond to requests from other entities. The user may further provide permissions regarding the items of interest, for example, using the GUI (e.g., of a distributed ledger wallet). As the user uses a browser to navigate to websites, an entity identifier of the user may be provided (e.g., automatically) to the websites to be used to request data regarding the user. For example, based on a web browser loading a website associated with an entity, the entity may receive the entity identifier of the user from a cookie, the web browser, and/or a plugin. The entity may then use the entity identifier to request data regarding the subject entity. Further, permissions of the subject entity may be identified using the entity identifier from the request to identify whether to allow or deny the request. The entity may receive a response to the request and use the response to determine content to present on the website.

Referring now to FIG. 1, a schematic depiction is provided illustrating an example system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 can include, among other things, a distributed ledger network 110 comprising a plurality of nodes 110N, such as the nodes 210A-210F later described with reference to FIG. 2, each in direct or indirect communication with one another via the network 120. It is contemplated that the nodes 110N can include a subset of designated nodes authorized to perform specifically-designated operations, such as validation, verification, or block generation, among other things. To this effect, nodes may work collectively to maintain a distributed ledger of a distributed ledger network 110 using a consensus module (not shown) that is independently included and operated by any number of nodes 110N. While any node may be capable of generating a transaction to be added to the distributed ledger, the consensus module may require that the record be added to the distributed ledger only based on a determination that a consensus (e.g., greater than 50%) of the nodes 110N (or designated nodes) has collectively validated the transaction. In this regard, while each node 110N may independently store a copy of the distributed ledger, a record may only be added to the distributed ledger when a consensus to add the record has been reached by the nodes 110N (or designated nodes) of the distributed ledger network 110.

The system can also include client devices, such as client devices 130, 130N. It is contemplated that any one or more of the nodes 110N may optionally be a client device 130, 130N, and client devices, 130, 130N may optionally be a node in accordance with embodiments described herein. Nodes 110N and client devices 130, 130N may be computing devices also described herein in accordance with FIG. 9.

In one aspect, a client device 130, 130N can include a consensus module (such as consensus module 330 of FIG. 3) similarly included in nodes 110N (or designated nodes) within the distributed ledger network 110. In another aspect, the client device 130, 130N can generate transactions that can initially be validated locally, via the consensus module included therein, before the transaction is passed on to other nodes. In another aspect, a client device 130, 130N can be in communication with nodes 110N via the network 120, and can locally generate a transaction for communication via the network 120 to nodes 110N that the client device 130, 130N is in communication with. In this way, the nodes 110N (or designated nodes) receiving the transaction directly or indirectly from the client device 130, 130N can validate the transaction in accordance with the present disclosure.

In some aspects, any node 110N can operate as a node that includes the consensus module, and any client device 130, 130N can operate as a client device that can: transmit communications to nodes 110N, generate transactions, and receive communications (e.g., transaction status, distributed ledger data) from nodes 110N. For purposes of simplicity, the following description will reference a client device 130, 130N as a node 110N, though embodiments are not limited as such.

Figure 4:
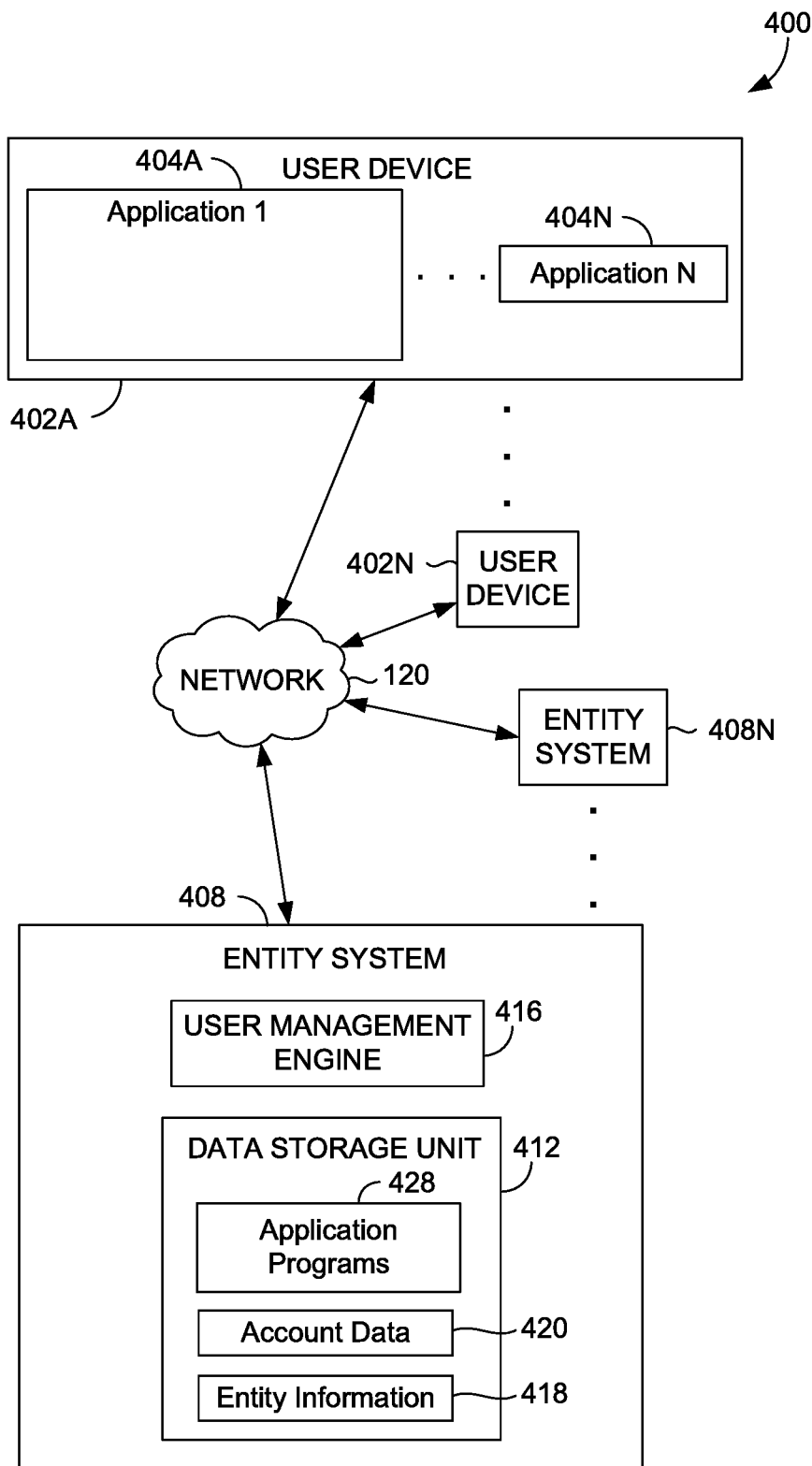
FIG. 4 is an example of an environment in which embodiments of the present disclosure can be practiced.

In some embodiments, one or more of the client devices 130, 130N can be a user device of a user, such as a user device 402A of FIG. 4. Additionally, or alternatively, a client device 130, 130N can be a system device, such as of entity system 408 of FIG. 4. User device 402A and entity system 408 are discussed in further detail below.

Each client device(s) 130, 130N may correspond to one client, or entity, and include any number of client devices, but may be referred to in singular for convenience. In some embodiments, a client device 130, 130N includes a server device(s), which may include at least one server device of the entity system 408 of FIG. 4. The server device(s) can be in communication with nodes 110N to send generated transactions to the nodes 110N, request and receive transaction status information from the nodes 110N, and/or request and receive distributed ledger data from the nodes 110N, among other things. In some further embodiments, the server device(s) can include one or more computing devices, also described in accordance with FIG. 9, whereby the computing devices include a consensus module to operate as a node 110N (or designated node). Among other things, the server device(s) can further provide services, such as data storage services, web hosting services for websites, user authentication services, certificate authentication services, backup services, data mining services, "cloud"-stored data or web search services, block explorer services, analytics services, and the like, including any combination thereof. Further examples are provided with respect to entity system 408 of FIG. 4.

In various embodiments, any combination of the components of system 100, such as nodes 110N, client devices 130, 130N, and/or server(s) 140 are used to implement any of the various components and functionality of data sharing infrastructure 170. Data sharing infrastructure 170 generally facilitates the sharing of data between entities using distributed ledger network 110. In doing so, various barriers to the sharing of data between entities may be alleviated, such that less data remains siloed amongst the entities and more data is shared there between. This may reduce the amount of computer storage consumed by low quality and/or redundant data and entities may rely on more complete and high quality data sets for their applications.

In some embodiments, entities may make requests for data regarding items of interest of subject entities using client device 130, 130N, server(s) 140 and/or node(s) 110N. Records 108 may include permissions stored on the distributed ledger that are used by data sharing infrastructure 170 to determine whether to allow or deny the requests. Using this approach, an entity may grant and modify permissions of various entities regarding various items of interest, as desired. Further, specific values of items of user information need not be provided in response to requests. Instead, at least some permissions may involve claims being provided to the entities over data sharing infrastructure 170, where the claims are responsive to interrogatories that use the values for multiple items to produce the claims. Additionally or alternatively, the user may grant permissions for data to an entity at a particular level of abstractness, such as to specify how general information is that used for responses. Using these approaches, specific values of items of user information may remain private and secure (e.g., on any combination of client device 130, 130N, server(s) 140 and/or node(s) 110N) while still being used to power entity applications.

Figure 2:
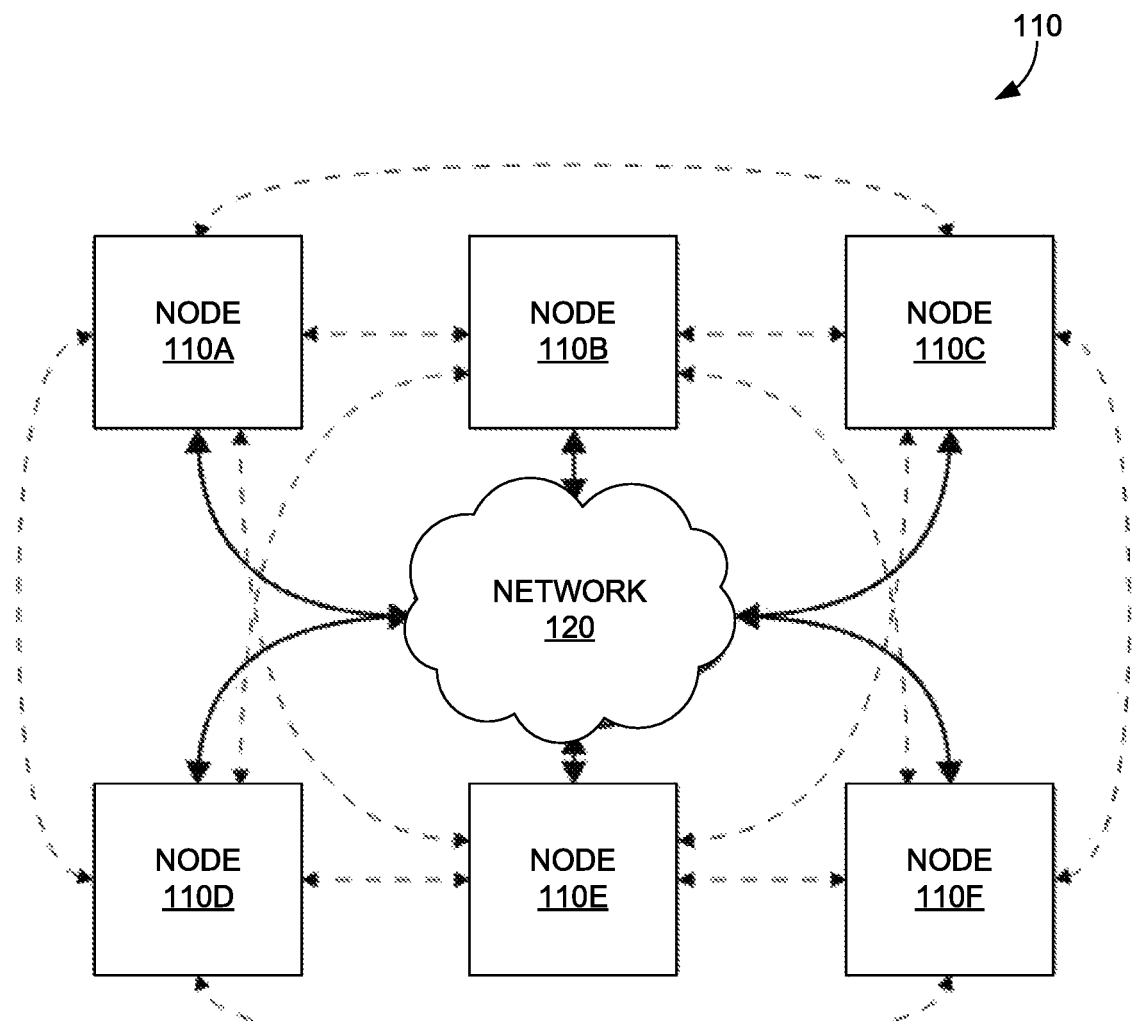
FIG. 2 is an example system diagram of a distributed ledger network in accordance with some embodiments of the present disclosure.

Turning now to FIG. 2 a schematic depiction is provided illustrating an example of distributed ledger network 110 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The distributed ledger network 110 depicted in FIG. 2 includes a plurality of nodes 110A-110F that are each in communication with nodes 110A-110F over a network, such as the Internet. Nodes 110A-110F may corresponds to nodes 110N of FIG. 1. Each node 110A-110F is a node of a distributed ledger network, which may be a node as later described in accordance with FIG. 3, and which may also be a computing device later described in accordance with FIG. 9. In some embodiments, and preferably for public distributed ledger implementations, each node 110A-110F in the distributed ledger network 110 can operate as a peer to every other node 110A-110F of the distributed ledger network 110 such that no single node 110A-110F is more influential or powerful than any other node 110A-110F. Operations performed by nodes can include, among other things, validating transactions, verifying blocks of transactions, and adding records to an immutable database that is collectively maintained by the nodes 110A-110F. It is contemplated, however, that in some embodiments, a particular subset of the nodes 110A-110F can be specifically designated for performing a subset of or all node operations described herein. In this regard, as opposed to embodiments where each node is a peer with other nodes, some embodiments can employ specially-"designated nodes" (preferably for private distributed ledgers or ecosystems where centralization is not a concern) that perform a subset of or all of the described node operations.

In accordance with embodiments described herein, the immutable database collectively maintained by the nodes 110A-110F may be referenced to herein as a distributed ledger, such as a blockchain, a tangle, a hashgraph, and the like. By way of example only, FIG. 2 is described with respect to a blockchain, however, nodes 110A-110F may be nodes other types of distributed ledger networks. The blockchain maintained by the distributed ledger network 110 includes a plurality of records that is immutable by virtue of the distributed nature of the distributed ledger network 110, applied cryptography concepts, and a consensus module (not shown) that is independently included and operated by any number of nodes 110A-110F. While any node may be capable of generating a transaction to be added to the blockchain, the consensus module may require that the record be added to the blockchain only based on a determination that a consensus (e.g., greater than 50%) of the nodes 110A-110F (or designated nodes) has collectively validated the transaction. In this regard, while each node 110A-110F may independently store a copy of the blockchain, a record may only be added to the blockchain when a consensus to add the record has been reached by the nodes 110A-110F (or designated nodes) of the distributed ledger network 110.

In various embodiments, validation of a transaction may be facilitated using features of asymmetric key cryptography (e.g., public-private key pairs), among other things. In some aspects, as is commonly known in public blockchains (e.g., Bitcoin), a private key can be employed to generate associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, digital tokens or other units of value (e.g., Bitcoin) can be "transmitted" from one wallet address (e.g., a public key of a sender) to another wallet address (e.g., a public key of a receiver). In actuality, however, the transmission of a digital token or unit of value is not a physical transfer, but is represented as a record of transfer from one wallet address to another that, if validated, is recorded onto the blockchain. The record may not be finalized (e.g., added to the blockchain), however, until the transfer is validated by a consensus of the nodes 110A-110F in the distributed ledger network 110.

To generate a transaction to transfer a digital token(s) or value, the owner of the sending wallet address may digitally sign the transaction with the private key associated with the sending wallet address. Nodes 110A-110F (or designated nodes) of the distributed ledger network 110 may independently determine that the transaction from the sending wallet address is valid by digitally authenticating the digital signature with the sending wallet address (e.g., the public key). The nodes 110A-110F (or designated nodes) may also independently determine, by referencing their independently-stored copy of the blockchain, that the sending wallet address is in fact associated with the digital token or value being transferred, or that the sending wallet address has sufficient liquidity (e.g., has a calculated aggregate value based on associated records in a local copy of the blockchain) to transfer the unit(s) of value. If a node (or designated node) in the distributed ledger network 110 determines that either of the foregoing conditions is not satisfied, the transaction may be determined to be invalid by the node and the transaction may not be passed on (e.g., communicated) to other nodes (or designated nodes) to which it is connected. On the other hand, if the node (or designated node) determines that both of the foregoing conditions are satisfied, the transaction may be determined to be valid and the node may pass on (e.g., communicate) the transaction, along with an indication that the node independently validated the transaction, to other nodes 110A-110F (or designated nodes) to which it is connected. As the nodes 110A-110F in the distributed ledger network 110 may all be directly or indirectly connected to one another, this validation process can continue until the nodes (or designated nodes) collectively determine that a consensus (e.g., a majority) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity.

After a consensus of validity for a transaction has been reached by the nodes 110A-110F (or designated nodes), the transaction may await confirmation (e.g., addition to the blockchain). As the nodes 110A-110F (or designated nodes) can be peers with each other, any node (or designated node) can participate in the process of adding the transaction to the blockchain. For purposes of background, the blockchain includes records of validated transactions that are grouped into a cryptographically chained series of blocks, whereby each block includes a subset of these records. Any node 110A-110F (or designated node) may be capable of performing the process of block generation, which can be implemented in a variety of ways based on a consensus algorithm implemented within its consensus module including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain, the transaction may first be included into a block that is being generated by one of the nodes 110A-110F (or designated nodes) and subsequently validated by a consensus of the nodes (or designated nodes) in the distributed ledger network 110. The transaction can be independently included into a block, or grouped together with other transactions, either of which are included within the purview of the present disclosure. Such implementations may vary, however, based on consensus module design and/or a block size (e.g., memory limitation) implemented or defined within in the consensus module operated by the nodes 110A-110F (or designated nodes). The node generating the block may also include, into the block it is generating, a cryptographic hash of the block most-recently added to the blockchain. Once generated in accordance with consensus rules defined within the consensus module, the node generating the block can send the generated block to the nodes (or designated nodes) to which it is connected.

The nodes (or designated nodes) receiving the generated block can then verify that the block includes one or more valid transactions, includes a hash value of the block most-recently added to the blockchain, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 110, the generated block including at least the transaction can be verified by another determined consensus of the nodes (or designated nodes). When a determination is made by a consensus of the nodes 110A-110F (or designated nodes) that a block is verified, the newly-verified block may be added to the blockchain immediately subsequent to the previously-added block, the hash of the previously-added block being included in the newly-verified block. As such, each block may be cryptographically "chained" to a previous block and a subsequent block. The cryptographic hashes may facilitate maintenance of the order and accuracy of records included in the blockchain.

In some instances, if the same transaction is included into a block generated by different nodes (or designated nodes) and validated throughout the network within a substantially similar timeframe, the blocks can be temporarily confirmed leading up to a fork in the blockchain (e.g., two potential branches stemming from the main chain). The forked chain can be maintained by the nodes (or designated nodes) until a determination is made, by a consensus of the distributed ledger network 110, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative blockchain.

In various embodiments, the blockchain is not necessarily limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, I.P. addresses, timestamps, hashes of any of the foregoing, or references to any of the foregoing. Any of the foregoing examples can be viewed as being the subject of a transaction, or can be indirectly associated with a transaction. For instance, ownership of an asset stored in a medium other than the blockchain (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

With specific regard to smart contracts stored as records on the blockchain, a smart contract can include any algorithm that defines an action or event that is to be triggered based on a determination that one or more defined conditions precedent to the action or event have occurred or are satisfied. In various embodiments, a smart contract can be generated, transmitted, received, stored, validated, and/or verified by any node or computing device described in accordance with the present disclosure. It is further contemplated that a consensus module of each node or computing device in the distributed ledger network 110 may be capable of interpreting and executing a Turing complete programming language, such as Solidity, by way of non-limiting example. It is further contemplated that in some embodiments, the blockchain itself is implemented based on the same programming language.

In various embodiments, smart contracts stored on the blockchain can be associated with a corresponding address, similar to that of a wallet address. The smart contract can be assigned a corresponding address by the distributed ledger network 110, or can be associated with a wallet address associated with one or more private keys. Counterparties associated with a smart contract can verify, via their respective computing devices in communication with one or more nodes of the distributed ledger network 110, that the smart contract has been immutably stored onto the blockchain based on a determined consensus of the nodes 110A-110F.

As smart contracts can be stored on the blockchain, each node (or designated node) can independently determine whether a smart contract's defined conditions precedent have occurred in order to verify that the terms of the smart contract have been met. In various embodiments, each node (or designated node) can determine occurrence of defined conditions precedent based on electronic information communicated thereto or retrieved thereby. The electronic information can include, among other things, another transaction addressed to or referencing the smart contract, data from one or more computing devices remote from the distributed ledger network 110, data from a website, data from a database, published news events, published weather events, or any other type of electronic information that can be transmitted to or accessed by a node (or designated node) via the network 120.

Like other transactions, each node (or designated node) can communicate this verification to one or more neighboring nodes (e.g., other nodes in direct communication with the node or designated node) until a consensus of the nodes 110A-110F (or designated nodes) of the distributed ledger network 110 have collectively verified occurrence of the defined conditions precedent. Based on a determination that the defined conditions precedent has been verified by a consensus of the nodes 110A-110F, the event or action defined by the smart contract can be executed. In various embodiments, the event or action can include the processing of a transaction (e.g., a processing of a transfer for digital tokens or value) that is held or locked until a determination that the conditions precedent have occurred. In this regard, any digital asset that is subject to the smart contract can be locked (e.g., held in escrow) by the smart contract until the determination has been made.

Figure 3:
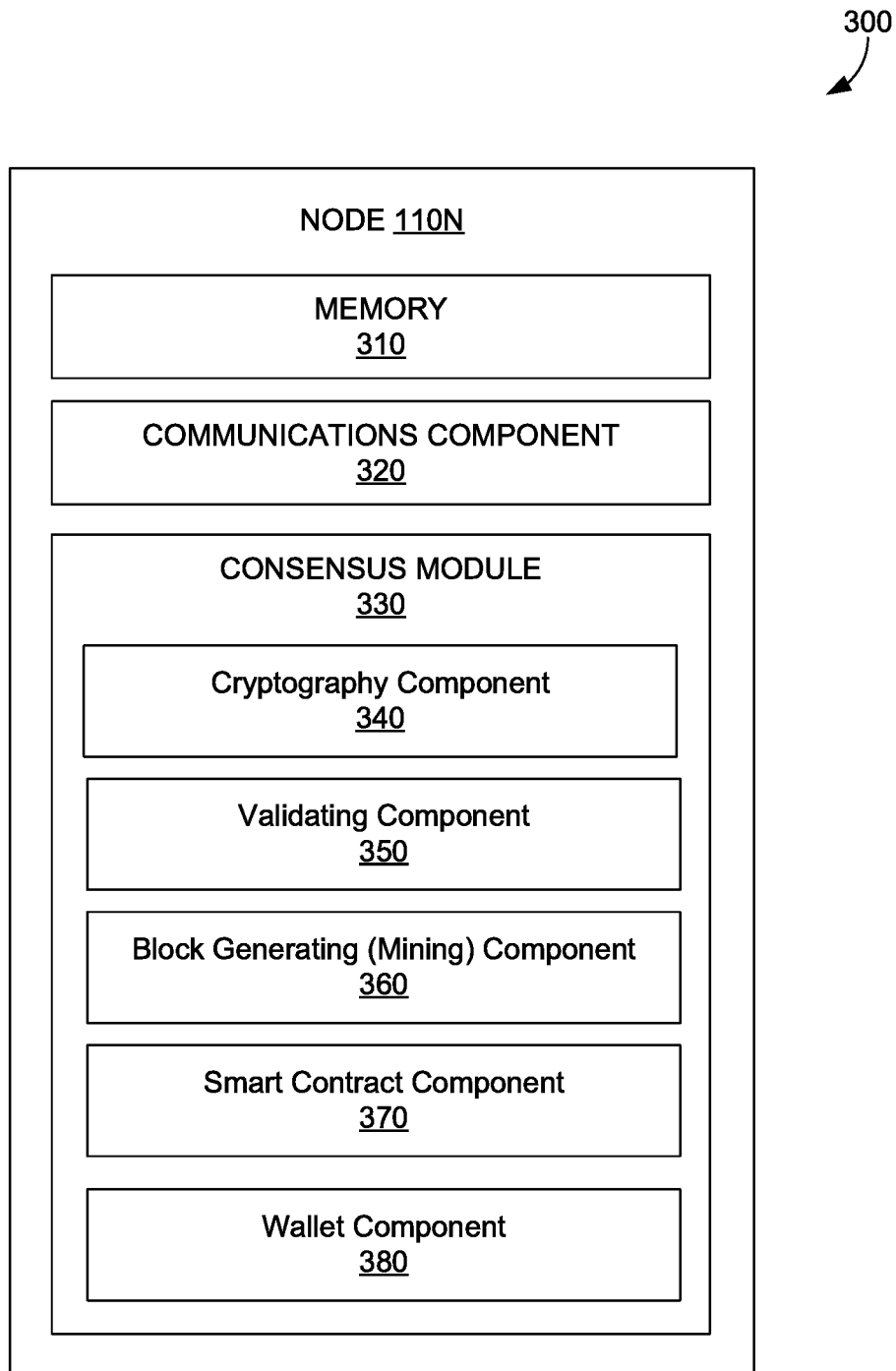
FIG. 3 is a block diagram depicting an example node of a distributed ledger network in accordance with some embodiments of the present disclosure.

Turning now to FIG. 3, a block diagram 300 is provided depicting example components of a node 110N (or designated node) in accordance with the present disclosure. The node 110N depicted in FIG. 3 can include, among other things, a memory 310, a communications component 320, and a consensus module 330. The memory 310 can include any type of memory, such as a hardware storage device, random access memory (RAM), a cache, read-only memory (ROM), and the like, including any combination thereof. The memory 310 can be employed to store executable computer code that, when executed by one or more processors of the node 110N, perform operations defined and/or implemented within the consensus module described herein. The memory 310 can also be employed to store data communicated from other nodes 110N, and/or client devices 130, 130N, such as those described in accordance with FIG. 2. The communicated data stored in memory can include, among other things, transactions, one or more blocks of a blockchain, determinations of validity, determinations of authentication/verification, unique identifiers and/or IP addresses of nodes 110N, and other types of electronic data not limited to the foregoing.

The communications component 320 can include any type of communications device that enables the node 110N to communicate with other nodes 110N, and/or client devices 130, 130N, such as those described in accordance with FIG. 2. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The consensus module 330 can include any number of components or subcomponents that, together with the memory 310 and communications component 320, enable the node 110N to operate as a peer node (or a peer to other "designated" nodes) in a distributed ledger network, such as distributed ledger network 110 described in accordance with FIG. 1. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Examples of components of the consensus module 330 include a cryptography component 340, a validating component 350, a block generating component 360, a smart contract component 370, and a wallet component 380. The cryptography component 340 may be used by the validating component 350, the block generating component 360, and the wallet component 380.

In some embodiments, the cryptography component 340 uses asymmetric cryptography (e.g., public-private key cryptography) for digital authentication/verification. Further, the cryptography component 340 may generate cryptographic hashes of data using a common-to-all-nodes hashing algorithm (e.g., SHA256, Scrypt, etc.). The cryptography component 340 may also be used to encrypt and decrypt data. For example, the data may be encrypted and stored on the distributed ledger using the cryptography component 340 and/or decrypted from data stored on the distributed ledger using the cryptography component 340. In this respect, data encrypted with a private key (from a private-public key pair), may be decrypted using an associated public key. However, data encrypted with a public key (from a private-public key pair), may only be decrypted using the private key. It noted that this is an example, and an entirely different encryption/decryption scheme may be used for encrypting/decrypting data for storage on the distributed ledger.

The validating component 350 may validate transactions by digitally authenticating digital signatures of transactions with a public key (e.g., of a sending wallet address). The validating component 350 may also verify "possession" and/or liquidity for the transactions based on a locally-performed cross-reference of the Distributed ledger for records associated with the public key (e.g., of the sending wallet address).

The block generating component 360 may perform the process of block generation, which can be implemented in a variety of ways based on a consensus algorithm implemented within the consensus module 330 including, but not limited to, proof of work, proof of stake, proof of authority, practical Byzantine Fault Tolerance, or Federated Byzantine Agreements.

The smart contract component 370 may be responsible for performing process used to implement smart contracts, such as has been described above. For example, the smart contract component 370 may interpret and execute smart contracts of the distributed ledger. Each node (or designated node) may need to verify occurrence of the conditions precedent of a smart contract(s) until at least a consensus has done so in order for a corresponding action or event to be triggered. The smart contract component 370 may verify occurrence based on data received and/or retrieved by the node 110N.

The wallet component 380 can securely store a private key (e.g., of a user and/or entity). The wallet component 380 may also filter out (from the locally-stored copy of the distributed ledger) all transactions associated with the public keys associated with the private key. This may be used so that a user and/or entity can view only those transactions that are relevant to the private key. In some embodiments, the wallet component 380 is associated with a GUI that provides a user and/or entity with a list of transactions of an associated private key(s). The wallet component 380 may receive inputs from a user and/or entity to generate transactions, and may sign those transactions with a secured private key. The wallet component 380 may also provide the user and/or entity with updates regarding the transaction status (e.g., via the GUI).

Turning now to FIG. 4, FIG. 4 is a diagram of environment 400 in which one or more embodiments of the present disclosure can be practiced. Environment 400 includes one or more user devices, such as user devices 402A-402N. Examples of user devices include, but are not limited to, a personal computer (PC), tablet computer, a desktop computer, cellular telephone, a processing unit, any combination of these devices, or any other suitable device having one or more processors. Each user device includes at least one application programs, such as applications 404A-404N. One or more of the applications 404A-404N may optionally be supported by one or more of entity systems 408A-408N.

Examples of entity systems include, but are not limited to, one or more of the server device(s) described above with respect to FIG. 2, which can provide one or more services, such as data storage services, web hosting services for one or more websites, user authentication services, certificate authentication services, backup services, data mining services, "cloud"-stored data or web search services, block explorer services, analytics services, and the like, including any combination thereof. Further examples are described below with respect to entity system 408A. It is to be appreciated that following description may generally refer to user device 402A as an example and any other user device may be similarly used. Further, the following description may generally refer to entity system 408A as an example and any other entity system may be similarly used.

In various embodiments, the components of a node, a client device, and/or data sharing infrastructure 170 of the example system 100 (e.g., node 110N, client device 130N, data sharing infrastructure 170) can be implemented using any combination of the user devices 402A-402N and entity systems 408A-408N (or at least some of those components may be implemented using one or more other devices). For example, any combination of those components may be hosted completely and/or partially on user device 402A and entity system 408A. In particular, any combination of entity systems 408A-408N (e.g., with or without a user device) and user devices 402A-402N (e.g., with or without an entity system) may be used to carry out various embodiments of the present disclosure.

As an example, application 404A may interface with the distributed ledger network using a wallet component 380 hosted at least partially by the entity system 408, or the wallet component 380 may be completely hosted within a user device or at least partially by one or more other systems. As a further example, one or more applications 428 of entity system 408 may interface with the distributed ledger network using a wallet component 380 hosted at least partially by the entity system 408 (e.g., integrated into one or more applications 428). For example, any combination of the applications of user devices 402A-402N and entity systems 408A-408N may be used to initiate or define requests regarding items of interest and subject entities, provide permissions and corresponding criteria that may define the permissions for use in responding to the requests, analyze the permissions for responses to the requests, grant or facilitate access to information provided in the responses, analyze interrogatories corresponding to the requests, determine claims responsive to the interrogatories, store any of the various information used for the forgoing, and the like.

As indicated above, an entity may refer to a user and/or a legal entity, such as an association, corporation, partnership, proprietorship, trust, or individual. Where the disclosure refers to a user, the disclosure can equally apply to an entity more generally, and similarly, user information can more generally apply to entity information.

A user may use user device 402A to interface with the distributed ledger network 110, as described herein, without employing an entity system 408. Additionally, or alternatively, the user may interface with the distributed ledger network 110 via an entity system 408. For example, the user may use one or more of applications 404A-404N on user device 402A to interface with the distributed ledger network 110, optionally via one or more application programs 428 of entity system 408. In this regard, the user may use one or more of applications 404A-404N (e.g., via a GUI which may be a the wallet component 380) to initiate requests for items, establish offers to provide values for one or more items, select the offers, enter the values of item, and/or provide or define any other inputs as described herein.

In various embodiments, entity system 408 may optionally translate user inputs to signals sent to the distributed ledger network 110, or may otherwise operate at the direction of users, as indicated by the user inputs, to communicate with the distributed ledger network 110. Additionally or alternatively, entity system 408 may interact with the distributed ledger network 110 without particular direction from the user inputs. As an example, entity system 408 may operate on behalf of one or more entities that are not users, such as an owner of entity system 408 and/or another entity system.

Entity system 408 optionally includes data storage unit 412. Data storage unit 412 can be implemented as one or more databases or one or more data servers (e.g., of the servers 140 of FIG. 2). Data storage unit 412 includes data that is used by the engines of entity system 408. Data storage unit 412 includes one or more applications 428, which may implement any of the various functionality of data sharing infrastructure 170 that is embodied using the entity system 408. For example, at least some of applications 428 may represent the various products, applications, or services supported by entity system 408 that a user of the user device 402A may interface with via network 120 (e.g., to share or manage the sharing of data associated with the user using the distributed ledger network 110). In some embodiments, data storage unit 412 includes account data 420 under which user and/or entity details are stored. Applications 428 may manage the interface with the users based on the account data 420. Alternatively or additionally, such data can be stored at the user device, such as user device 402A, or another entity system 408N.

Entity system 408 may optionally maintain entity information 418 in data storage unit 412. Entity information 418 may include information of entities, such as values of items of interest and/or information used to generate the values, which may be shared using data sharing infrastructure 170. The entity information 418 may be obtained in various manners, such as directly from the users and/or entities, from other users and/or entities (e.g., via data sharing infrastructure 170), from inferences, determinations, and/or analysis of user inputs to the entity system 408 and/or application 404A, and more. It is noted that the sharing, storage, and collection of user and/or entity information should be implemented using best practices for maintaining privacy of entities and users.

A user of user device 402A may visit a webpage or an application store to explore and/or access applications 428 supported by entity system 408. Entity system 408 may provide one or more of the applications 428 as a software as a service (SaaS), or as a standalone application that can be installed on user device 402A (e.g., application 404A), or as a combination (e.g., application 404A). The user can create an account with entity system 408 by providing user details and also by creating login details that are captured in account data 420. Alternatively, entity system 408 can automatically create login details for the user in response to receipt of the user details. In some embodiments, the user can also be prompted to install an application manager. The application manager enables the user to manage installation of various applications supported by entity system 408 and also to manage other functionalities, such as updates, subscription account and the like, associated with the applications.

Upon download, installation and/or launching of an application program (e.g., application 404A and/or one or more of applications 428), in some embodiments, the user is asked to provide login details. A check on the login details may be performed by entity system 408 to ensure that the user is entitled to use the application program.

Figures 5A, 5B:
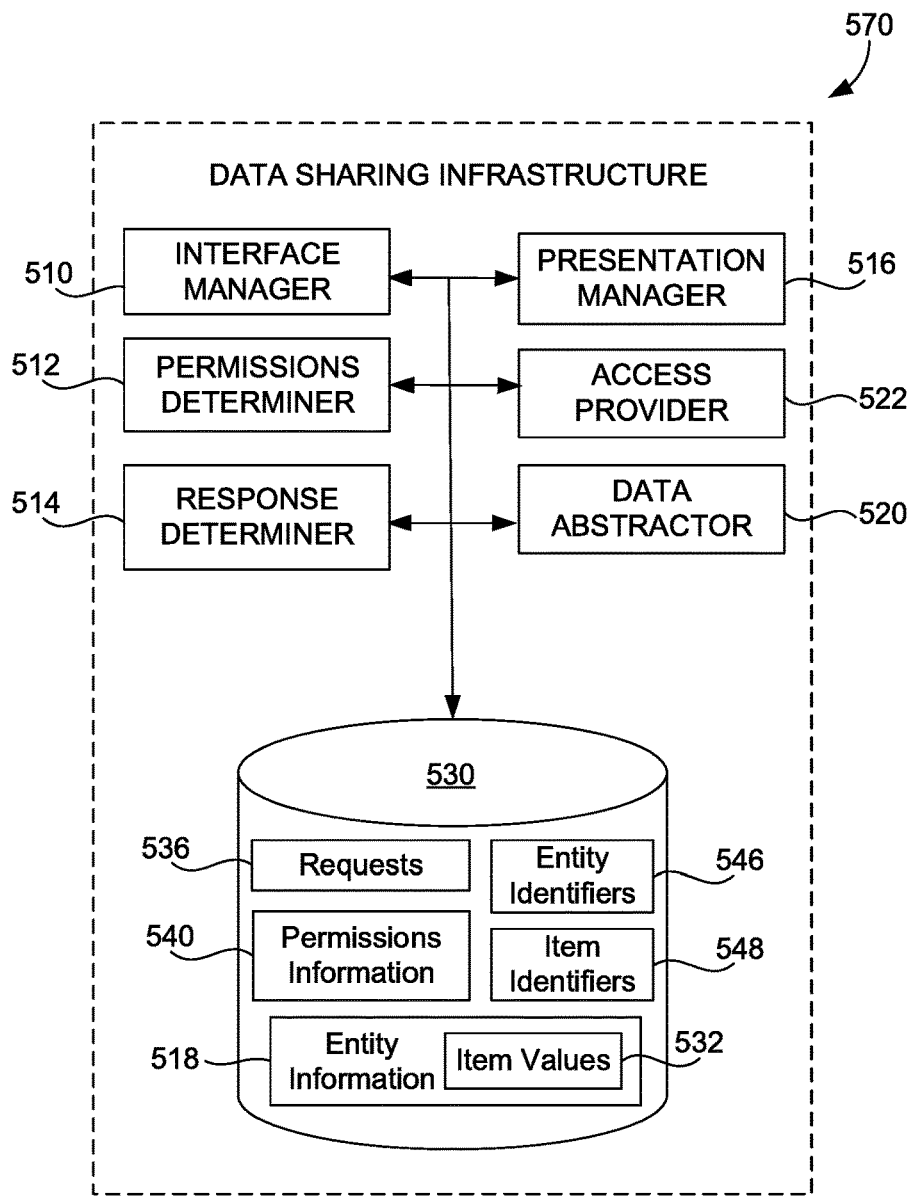
FIG. 5A is a block diagram depicting an example of data sharing infrastructure in accordance with some embodiments of the present disclosure.
FIG. 5B illustrates an example of a permissions interface in accordance with some embodiments of the present disclosure.

Turning now to FIG. 5A, FIG. 5A is a block diagram depicting an example of data sharing infrastructure 570 in accordance with some embodiments of the present disclosure. Data sharing infrastructure 570 can correspond to data sharing infrastructure 170 of FIG. 1. By way of example, data sharing infrastructure 570 includes interface manager 510, permissions determiner 512, response determiner 514, presentation manager 516, access provider 522, data abstractor 520, and storage 530.

As indicated above, the various components of data sharing infrastructure 570 may be integrated in any of the combination of distributed ledger network 110, client device 130, 130N, and servers 140, variations of which are described herein. For example, the components may be implemented, at least partially, as or using one or more of application 428, application 404A, one or more smart contracts on the distributed ledger, and/or other software.

As an overview, interface manager 510 is generally responsible for managing interfaces between devices, systems, and/or entities. This may include receiving requests 536 regarding values 532 of items from entities, receiving permissions and corresponding criteria that may define the permissions for use in responding to the requests 536, and/or transmitting data to provide access to responses to requests 536 and/or to store any of the various information associated with the forgoing (e.g., on the distributed ledger). Presentation manager 516 manages presentation of information on user devices, such as on a display or other output component of a user device 402A or client device 130, 130N (e.g., via a GUI). Presentation manager 516 may do so to facilitate interface manager 510 receiving user inputs, such as user inputs that specify and/or define the permissions and corresponding criteria, user inputs that specify and/or define values of items regarding an entity for responses, and/or user inputs that specify and/or define parameters of the requests 536. Permissions determiner 512 analyzes the permissions to determine whether to grant or deny access to values 532 for responses to the requests 536. Response determiner 514 determines claims that are responsive to the requests, including value to use to produce the claims. Data abstractor 520 abstracts, or generalizes, entity information, such as by categorizing or broadening values into more abstracted values. Access provider 522 is configured to provide access to information (e.g., claims or item values 532) for the responses to the requests 536.

To this effect, the various components of data sharing infrastructure 570 may use storage 530 to provide and/or store data used by the various components thereof. Examples of this data includes entity information 518 (e.g., corresponding to entity information 418 of FIG. 4), requests 536, permissions information 540, entity identifiers 546, and item identifiers 548. Storage 530 may represent any combination of data stores across the various devices and systems described herein. For example, data in storage 530 may be on the distributed ledger, on a user device, and/or in a private data store (e.g., of entity system 408) which may correspond to data storage unit 412.

As mentioned above, interface manager 510 is generally responsible for managing interfaces between devices, systems, and/or entities. This can include receiving and/or transmitting communications over network 120. Additionally, or alternatively, this can include receiving user inputs from users (e.g., user devices) and/or providing outputs to users (e.g., using presentation manager 516). For example, an output may include a GUI (e.g., in application 404A) that presents a response to a request and/or receives the request. The same or a different GUI may receive user inputs that define or specify values 532 or other entity information used to derive values 532 and/or define or specify permissions and/or criteria thereof involving items (e.g., using item identifiers 548) and/or values 532.

FIG. 5B illustrates an example of a permissions interface in accordance with some embodiments of the present disclosure. Permissions interface 572 is an example of a GUI (e.g., of a distributed ledger wallet) that may be presented using presentation manager 516 and may be used by a user to define and/or specify values for items and associated permissions and criteria thereof. It is noted that permissions interface 572 can vary widely from what is shown. Permissions interface 572 includes item 550A, corresponding to the user's age. As shown, the user may specific a particular value for item 550A, such as in a form element. As another example, item 550B may be similar to item 550A, but rather than entering a specific value 532, the user selects and/or enters a range or category value 532 that includes the specific value. By way of example, selectable radio buttons and options are shown.

Also in FIG. 5B, the user may define and/or specify various criteria regarding permissions of item 550A. For example, the user may select or specify the entity (or entities) to which the permissions pertain (e.g., using a dropdown), which in the present example is "Entity_1." The user may further select, define, or specify a level of abstractness used for item 550A when providing a response to a request from the corresponding entity. In the example shown, the user may select a number of range, or categories, used to provide responses to the requests for item 550A and "Entity_1."

In the example shown, the user has selected three ranges, which may render the value of item 550A similar to item 550B. For example, the user selection may define that a level of abstractness of a logical expression comprising item 550A in an interrogatory matches a level of abstractness granted by the user selection. For example, the logical expression in an interrogatory for the entity may be "(Age>=18 and <=55)," or "(AgeRangeCategory2==true)," which is permitted by response determiner 514 as it conforms to the level of abstractness defined by the user. In this case, the logical expression returns true if the user's age falls within the specified range or category and otherwise returns false. Thus, the user is not revealing a specific age (e.g., 31) and privacy is enhanced while the user retains control of that information. However, had the logical expression of the interrogatory been "(Age=31)," response determiner 514 may not permit a response as it conflicts with the level of abstractness for item 550A.

FIG. 5B also shows an example of other options, or access parameters, a user may select and/or define for controlling access to values of items of interest owned by the user. For example, in permissions interface 572, selecting "None" may revoke all previously granted access to the entity. As another example, a user may similarly revoke direct access to values, but enable access to claims involving the values, or vice versa (not shown). Further, in some cases, the user may define one or more temporal parameters used to control access to values for responses to requests. In the example shown, the temporal parameters include a user defined duration (e.g., 48 hours) in which access is permitted, and a time range in which access is permitted (e.g., a date range, which may begin at a specified time in the future).

As a further example, a permission may optionally include an offer worth(s), or defined worth(s), of each item and/or items of interest regarding the subject entity. An offer worth may represent a monetary value (e.g., in a cryptocurrency of the distributed ledger) that is to be transferred to the subject entity if the corresponding information is to be used to satisfy a response to the request (e.g., as a condition on use of the data). The offer worth may be specified at the item level, group of item level, interrogatory level, entity level, and the like. Further, the offer worth for a request may be a total sum of offer worths for information involved in determining a response to the request. For example, a request may optionally include a request worth, which may represent a monetary value (e.g., in a cryptocurrency of the distributed ledger) that is to be transferred to one or more other entities if a valid response it provided to the request. At least some of the request worth may be distributed to one or more subject entities that provide one or more values for a response to the request and/or one or more third party entities, such as based on the entity providing any of the various functionality of data sharing infrastructure 570 (e.g., verifying permissions for requests, storing and providing values for responses to the requests, and/or providing access to responses to requests) and/or based on the entity operating a node of distributed ledger network 110 (e.g., as a validation fee, mining fee, and the like). Where the request worth for a request satisfies the offer worth desired by the subject entity for the request, the request may be approved (e.g., a permission may be determined to grant a right for a request). Thus, a subject entity may, for example, derive additional compensation from providing a value for an item (e.g., 550A) that is more specific compared to a similar more abstract item (e.g., 550B).

It should be appreciated that these are only some examples of criteria or parameters for permissions. Further, any of these various parameters could be system defined and optionally could assume default values. Further, the user may specify different parameters for permissions for different entities or groups of entities. Additionally, parameters and/or permissions could be defined by the user or system at the group level, such that they apply to a group of items. As an example, one set or group of items could represent biometric-related items, such as a user's heart-rate and blood pressure readings. Another group could represent detailed demographic information, such as specific values for a user's residence, gender, and age. Further, another could represent abstract demographic information, such as abstract values for a user's residence, gender, and age.

It is noted, different groups of items could include the same or similar items. Further, groups of items or particular items may in some cases be based on the same underlying values. For example, a user may provide a specific age (e.g., 31), and data abstractor 520 may abstract the value to a more generalized or abstracted value, such as "Between 18 and 55." Using this approach, the user may only provide a single value to provide values for multiple items. Additionally, the system need only store a single value to provide values for multiple items of interest. Additionally or alternatively, data abstractor 520 may abstract values to match those needed to produce claims in response to interrogatories and/or to match permissions for items, as needed.

Thus, interface manager 510 may receive communications from user device 402A (e.g., from application 404A), entity system 408 and/or other entity systems 408N that provide values for items, define permissions for the items, and/or otherwise perform other functionality described herein (e.g., according to user inputs). Additionally or alternatively, interface manager 510 may provide the communications to distributed ledger network 110 and/or receive information from distributed ledger network 110 (e.g., by scanning or analyzing the distributed ledger).

For example, in some embodiments, interface manager 510 of entity system 408 receives and/or determines the values and/or permissions and records the received information to the distributed ledger of distributed ledger network 110. The recorded permissions may be included in permissions information 540 of FIG. 5B. The recorded values may be included in entity information 518 of FIG. 5B. Recording the information may include creating one or more transactions (e.g., in a transaction block) on the distributed ledger. The one or more transactions may record the values and/or permissions and may be digitally signed, for example, using a key associated with the user or entity that owns the information and/or an entity operating entity system 408. Additionally or alternatively, entity system 408 may not be employed. For example, an entity system 408N or a user device 402A could record the information to the distributed ledger without using entity system 408. Additionally or alternatively, one or more smart contracts of the distributed ledger may receive the values and/or permissions (e.g., and record the information to the distributed ledger).

In some embodiments, permissions may be updated by recording new permissions to the distributed ledger. For example, a most recent permission may be used for an item such that the permission may be overridden by providing a new permission to the distributed ledger with a more recent timestamp and/or transaction identifier. Further, where the values are written to the distributed ledger, it is contemplated that they are encrypted. However, one or more of the values may not be written to the blockchain. For example, entity system 408 or another entity, such as the user, could store and maintain the values used for responses encrypted in a private data storage unit 412.

In some embodiments, a user and/or an entity makes a request including an indication of one or more items of interest for a response to the request, one or more interrogatories involving the items of interest for a response to the request, a subject entity of the request, and/or an entity to receive a response to the request. The request may be made by or on behalf of an entity (e.g., made by another entity). The receiving entity, subject entity, interrogatory, and/or items of a request may be identified explicitly in the request and/or implicitly by the request. A request may optionally include a request worth, which may represent a monetary value (e.g., in a cryptocurrency of the distributed ledger) that is to be transferred to one or more other entities if a valid response it provided to the request. At least some of the request worth may be distributed to one or more entities that provide or facilitate providing one or more values for a response to the request and/or one or more third party entities, such as based on the entity providing any of the various functionality of data sharing infrastructure 570 (e.g., verifying permissions for requests, storing and providing values for responses to the requests, and/or providing access to responses to requests) and/or based on the entity operating a node of distributed ledger network 110 (e.g., as a validation fee, mining fee, and the like).

Interface manager 510 may receive the request over one or more network communications. As an example, interface manager 510 of application 428 of entity system 408 may receive a request from a user device 402A based on user input to application 404A. Additionally or alternatively, node 110N may receive the request from user device 402A and/or entity system 408. Additionally, or alternatively, node 110N (e.g., optionally using an executing smart contract) and/or entity system 408 may receive the request from one or more digitally signed transactions of the distributed ledger (e.g., in one or more blocks) of the distributed ledger network 110. For example, interface manager 510 may analyze the distributed ledger for requests (e.g., periodically or based on another trigger).

In some embodiments, entity system 408 generates one or more transactions that include or represent a request and records them to the distributed ledger, such that the distributed ledger network 110 receives the request. As another example, user device 402A may generate one or more transactions that include or represent the request, and the distributed ledger network 110 (e.g., the distributed ledger) may receive the request without use of entity system 408 (e.g., directly from the user device). Requests 536 represent records of the requests received by data sharing infrastructure 570 that optionally may be persistently retained. For example, requests 536 may be recorded on the distributed ledger and/or in a private data store (e.g., of entity system 408), similar to entity information 518 and permissions information 540.

Interface manager 510 may identify the receiving entity, the subject entity, the interrogatory, and/or the item(s) corresponding to the request. Identification may be performed, for example, by application 404A, application 428, and/or one or more smart contracts of the distributed ledger. As an example, the entity may be identified based on account data 420. For example, the request may be received while the receiving entity is logged into a corresponding account, which entity system 408 uses to identify the user or entity. In various embodiments, interface manager 510 may identify the receiving entity and/or a subject entity of a request based on an entity identifier (e.g., of entity identifiers 546) provided in or in association with the request. As one example, the entity identifier could correspond to a private key associated with the entity (e.g., the entity identifier could be a public key corresponding to the private key). Similarly, the request may identify the item(s) and/or interrogatory using one or more item identifiers (e.g., of item identifiers 548), which correspond to a group of items, individual items, and/or an interrogatory that uses one or more particular items. As another example, the request itself may be specific to the item(s) and/or one or more interrogatories. For example, there may be different types of requests that correspond to different subsets of the items and/or different interrogatories.

In some cases, the items are implemented at least partially using a standard data model. Item identifiers 548 may be part of the standard data model and interface manager 510 may reference item identifiers received in requests to item identifiers 548 of the standard data model. As another example, interface manager 510 may map or translate the received item identifiers or other item identifying information to the standard data model (e.g., to item identifiers 548 of the standard data model). For example, the standard data model may be employed by one or more other components of data sharing infrastructure 570, and interface manager 510 may translate received information so it is compatible with or useable by the other components. Interface manager 510 could receive requests from various entities that identify items in different formats and/or structures, which may correspond to different data models, and translate them into the standard data model. In some examples, interface manager 510 (whether the interface manager 510 refers to application 428, application 404A, and/or a smart contract on the distributed ledger) records information to the distributed ledger according to the standard data model, and/or reads the information from the distributed ledger according to the standard data model.

Values 532 (which may also be referred to as "item values 532") represent values of items, such as values of items requested by entities or used to determine claims of interrogatories from entities, which are used to determine responses to requests. Each value of values 532 may correspond to an item, such as an item defined by the standard data model. For example, for an item representing an age demographic, a value may be an age (e.g., 54), for an item representing a country demographic, a value may be a country (e.g., USA), for an item representing a hobby, a value may be an activity (e.g., cycling). In some embodiments, a request may further identify a subject of one or more of the items, such as an entity to which an item pertains (or an owner of the entity information). For example, a request may identify hobbies of a user, and one or more values for the item for the user may be provided including cycling, reading, etc. It should therefore be appreciated that one or more values for an item of a request may be used for an entity.

Item values 532 are shown as being in storage 530 as an example only. In some cases, one or more values 532 that are used to determine a response to a request are determined on the fly from other data (e.g., other entity information 518, such as entity information 418 of FIG. 4). For example, the value may be inferred or derived from other data as needed and may not by stored persistently. As indicated above, one or more of values 532, or data used to derive one or more values 532, may be stored on and/or accessed from the distributed ledger, a user device, and/or a private data store (e.g., of entity system 408). The values may be encrypted/decrypted using any suitable approach, such as using cryptography component 340 or approaches used by cryptography component 340. One or more of values 532 may be associated with one or more entities. For example, entity information 518 may capture which entities have values for which items.

In some embodiments, a request specifies or identifies one or more entities to which one or more of the items of the request pertains (e.g., subjects of the request). For example, the request may include an entity identifier of an entity associated with the request (e.g., that is a subject entity of the request). In such a case, a set of values 532 may be determined based on the one or more entities to use for a response to a request.

In some embodiments, the user uses an application associated with an entity, or uses a browser to navigate to a website associated with the entity. An entity identifier of the user may be provided (e.g., automatically) to the website and/or the entity to be used to request data regarding the user. For example, based on a web browser loading a website associated with the entity, the entity may receive the entity identifier of the user from a cookie, the web browser, and/or a plugin. The entity may use the entity identifier to request data regarding the subject entity. Further, permissions of the subject entity may be identified using the entity identifier from the request to identify whether to allow or deny the request. The entity may receive a response to the request and use the response to determine and/or select content to present on the website and/or in the application.

Having received a request, permissions determiner 512 may determine a set of permissions corresponding to the request. As used wherein, a set of permissions may refer to at least one permission. For example, permissions determiner 512 may use at least the subject entity identified by the request to identify one or more permissions associated with the subject user in permissions information 540. Optionally, other parameters of permissions may be used to identify the permissions. For example, permissions determiner 512 may use a receiving entity identified by a request to identify one or more permissions granted to the receiving entity (e.g., "Entity_1" of FIG. 5A). Further, permissions determiner 512 may determine whether one or more of the permissions correspond to the subject entity granting the receiving entity a right to receiving a response corresponding to the request. For example, permissions determiner 512 may analyze the permissions to determine a request complies with or conforms to the rights available to a requesting and/or receiving entity, and approve or deny a request accordingly. As an example, a request from "Entity_1" may be to receive in a response and/or use the specific value of item 550A to generate a response, in which case permissions determiner 512 may deny the request based on the level of abstractness and/or other parameters of the permissions. For example, permissions determiner 512 may determine a level of abstractness of a logical expression comprising an item of the items of the interrogatory of a request matches a level of abstractness granted by the subject entity for a right in order to determine permission(s) apply to the request.

Response determiner 514 may determine responses to requests. Response determiner 514 may use a request and/or a corresponding permission(s) matched to the request by permissions determiner 512, at least in part, to determine a set of the values 532 used for a response to the request. In some embodiments, the request is for one or more results of one or more interrogatories that are based on the values. The one or more interrogatories may be specified in the request or otherwise associated with the request. As an example, a result may comprise a logical value, such as a true value for a claim to an interrogatory that is true and a false value for a claim to the interrogatory that is false. A single interrogatory may be based on one to all of values used for a response. An interrogatory may refer to a logical expression that uses one or more values of one or more items of interest to produce a result. As an example, a logical expression could be "is a particular user older than 18" (e.g., evaluated using an age item value of the user) and living in one of Europe, USA, and Canada (e.g., evaluated using a country item value of the user).

In embodiments where a request involves one or more interrogatories, response determiner 514 may analyze an interrogatory to determine a response to the request. For example, response determiner 514 may determine a claim for an interrogatory based on values of items corresponding to the interrogatory. In some embodiments, response determiner 514 determines a claim based on interface manager 510 receiving a request and/or permissions determiner 512 approving the request based on permissions and related parameters. In others, the claim may be predetermined for an interrogatory and retrieved for a response. As mentioned above, the interrogatory may include one or more logical expressions, optionally provided in a request and/or by a requesting entity. A result of a logical expression may depend upon one or more values of one or more items of interest regarding the subject entity. Further, a claim may correspond to an overall result of any logical expressions included in an interrogatory (e.g., a true or false value). It is contemplated that a request may involve any number of subject entities and any number of entities may be receiving entities for a response to a request. In some embodiments, data abstractor 520 abstracts values as needed by response determiner 514 to evaluate an interrogatory. Further, response determiner 514 and/or data abstractor 520 may decrypt one or more of the values to determine claims, for example, using cryptography component 340 of FIG. 3.

In some embodiments, response determiner 514 is implemented as one or more smart contracts on the distributed ledger. As another example, response determiner 514 may be implemented as an application 418 of entity system 408 or application 404A of user device 402A (e.g., of the subject entity).

In some embodiments, claims may be implemented using zero-knowledge proofs. For example, response determiner 514 may determine a claim using a zero-knowledge proof that is based on the one or more values (e.g., a set of values used for a response). The zero-knowledge proof may ensure the subject entity or entities of the request possess the values without revealing the values themselves. Thus, a requesting entity may more readily rely upon the response. Further, a subject entity providing a value may maintain scarcity of the value while protecting the privacy of the information.

Based on the determining of the response, access provider 522 may provide a receiving entity access to the response. In some embodiments, access provider 522 creates digitally signed transactions (e.g., in a transaction block) on one or more copies of the distributed ledger of the distributed ledger network 110 to record the response and/or include the response. The transaction may be created, for example, by entity system 408 and/or user device 402A generating the transaction(s), validating the transaction, and/or sending the transactions to one or more nodes of the distributed ledger network 110 (e.g., for inclusion in a transaction block). In addition, or alternatively, a node (e.g., via one or more smart contracts) of the distributed ledger network 110 may perform any combination of this functionality to create the transaction(s) in the transaction block.

The transaction(s) may correspond to a response to a request. For example, the transaction(s) may represent a record of a response to a request. Further, the transaction(s) may capture and/or identify various information regarding the request and/or the response. Examples of the information includes information identifying entities requesting the response and/or receiving the response, one or more subject entities of the response, one or more items or groups of items and/or interrogatories involved in the response, a request worth of the request, and the like.

The response to a request may also be provided in the record, in a separate record, and/or in one or more network communications that include the response (e.g., to a receiving and/or requesting entity device). For example, access provider 522 may be implemented using one or more smart contracts on the distributed ledger used to provide the response, one or more of entity systems 408A-408N to provide the response, and/or one or more user devices 402A-402N to provide the response. Access provider 522 may encrypt the response, for example, using a key associated with a receiving entity, such that the receiving entity can securely access the response. Additionally or alternatively, access provider 522 may provide one or more keys to the receiving entity, which the receiving entity may use to decrypt the response.

It is noted a response may be provided over one or more communications and may come from one or more devices. Further, a response may be pushed or provided by access provider 522 to a user device 402A associated with a requesting or receiving entity and/or retrieved by the entity. A response to a request may contain one or more of the values provided by a subject entity. In addition or instead, a response to a request may be based on the one or more values, but may not include any values in the response. For example, a response may include one or more results of one or more claims that are based on the one or more values. As an example, a result may comprise a true value for a claim that is true and a false value for a claim that is false. A single claim may be based on one to all of the values of a response.

Figure 6:
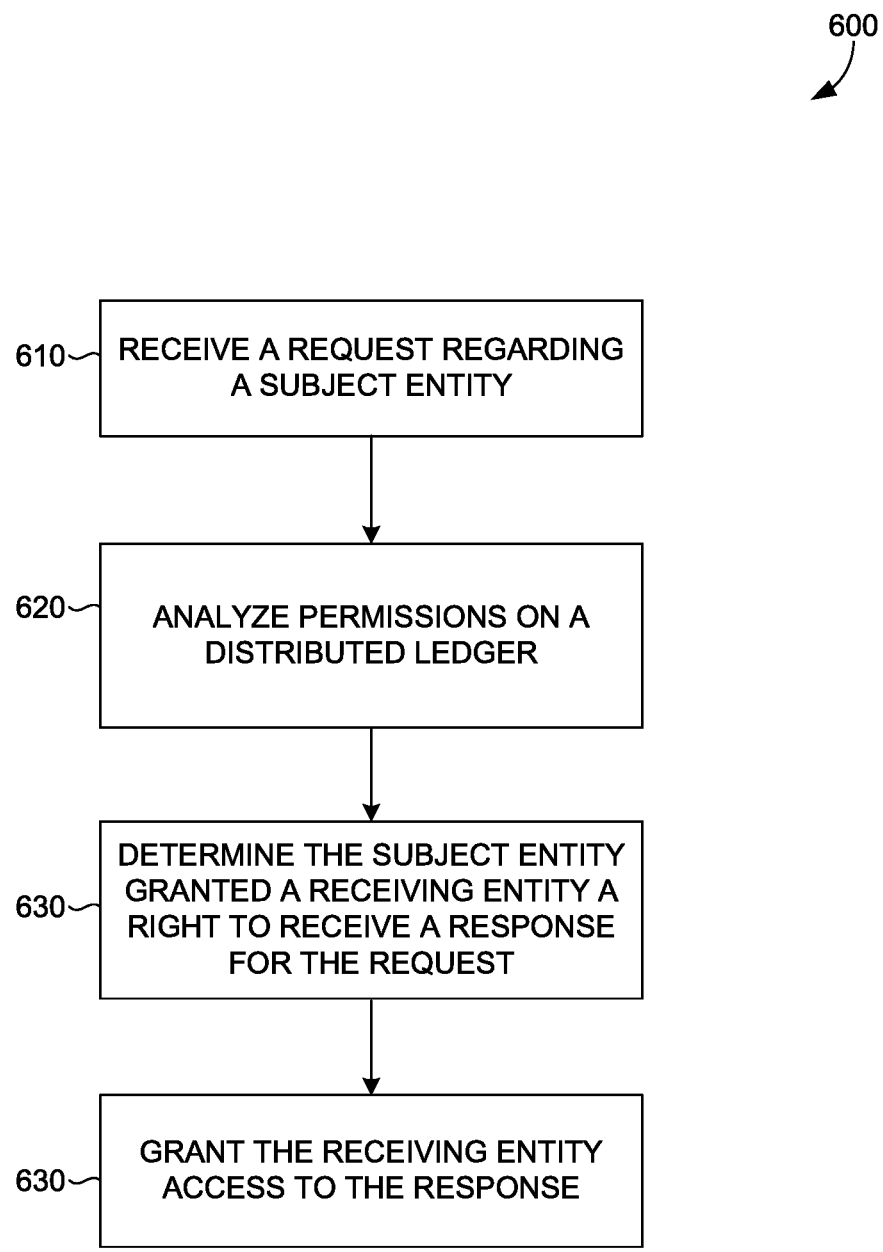
FIG. 6 is a flow diagram showing a method for facilitating sharing of data between entities in accordance with some embodiments of the present invention.

Referring now to FIG. 6, a flow diagram is provided showing an embodiment of a method 600 for facilitating sharing of data between entities. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Method 600 is described with respect to entity system 408 by way of example. However, method 600 may be employed by any combination of entity systems 408A-408N (e.g., application(s) 428), user devices 402A-402N (e.g., application(s) 404A), and/or nodes 110A-110N (e.g., one or more smart contracts).

At block 610, method 600 includes receiving a request regarding a subject entity. For example, interface manager 510 of entity system 408 may receive a request of requests 536 for a response, which identifies the subject entity using an entity identifier of entity identifiers 546. The request may further identify a plurality of items of entity information to use for the response, such as using item identifiers 548. The request may be for one or more claims that is produced based on values of the items of entity information of the subject entity and is responsive to one or more interrogatories corresponding to the request. Additionally or alternatively, the request may be for one or more of the values themselves. The request may be received, for example, from entity system 408N. As another example, the request may be received in data (e.g., a transaction block) from the distributed ledger.

At block 620, method 600 includes analyzing permissions on a distributed ledger. For example, permissions determiner 512 of entity system 408 may, based on the receiving of the request, analyze one or more permissions of permissions information 540 included in one or more digitally signed transactions (e.g., of one or more transaction blocks) on one or more copies of a distributed ledger maintained at least in part by one or more nodes 100N of distributed ledger network 110. As an example, permissions determiner 512 may use the entity identifier of the subject entity to identify the permissions granted by the subject entity, may use an entity identifier of a receiving entity of the response to identify which of the permissions were granted to the receiving entity, and may use the item identifiers (or item set identifiers) to identify which items of entity information the permissions pertain to.

At block 630, method 600 includes determining the subject entity granted a receiving entity a right to receive a response for the request. For example, based on the analyzing of the one or more permissions, permissions determiner 512 of entity system 408 may determine the one or more permissions represents the subject entity granting a receiving entity with a right to receive responses (e.g., claims that are responsive to interrogatories) to requests that use the values to produce the responses, the values being owned by the subject entity.

At block 640, method 600 includes granting the receiving entity access to the response. For example, access provider 522 of entity system 408 may granting the receiving entity access to the response. In some embodiments this includes access provider 522 transmitting the response to the receiving entity. As another example, access provider 5229 may store the response in a manner that is accessible to the receiving entity. In some cases, this includes access provider 522 encrypting the response using a public key associated with the receiving entity. In some cases, this includes providing the receiving entity with a key capable of decrypting the response. In some cases, this includes storing the encrypted response on the distributed ledger.

Is some embodiments, the granting the receiving entity access to the claim is based on an amount of digital currency being in escrow on the distributed ledger. For example, the requesting and/or receiving entity may place the currency in escrow (e.g., using one or more smart contracts). This may be a condition precedent on the granting of the access. In some case, the amount of currency is based on the offer worth of the request, and based on the granting the receiving entity access to the claim, at least some of the digital currency is transferred from escrow to the subject entity (e.g., on the distributed ledger via a one or more transactions).

Figure 7:
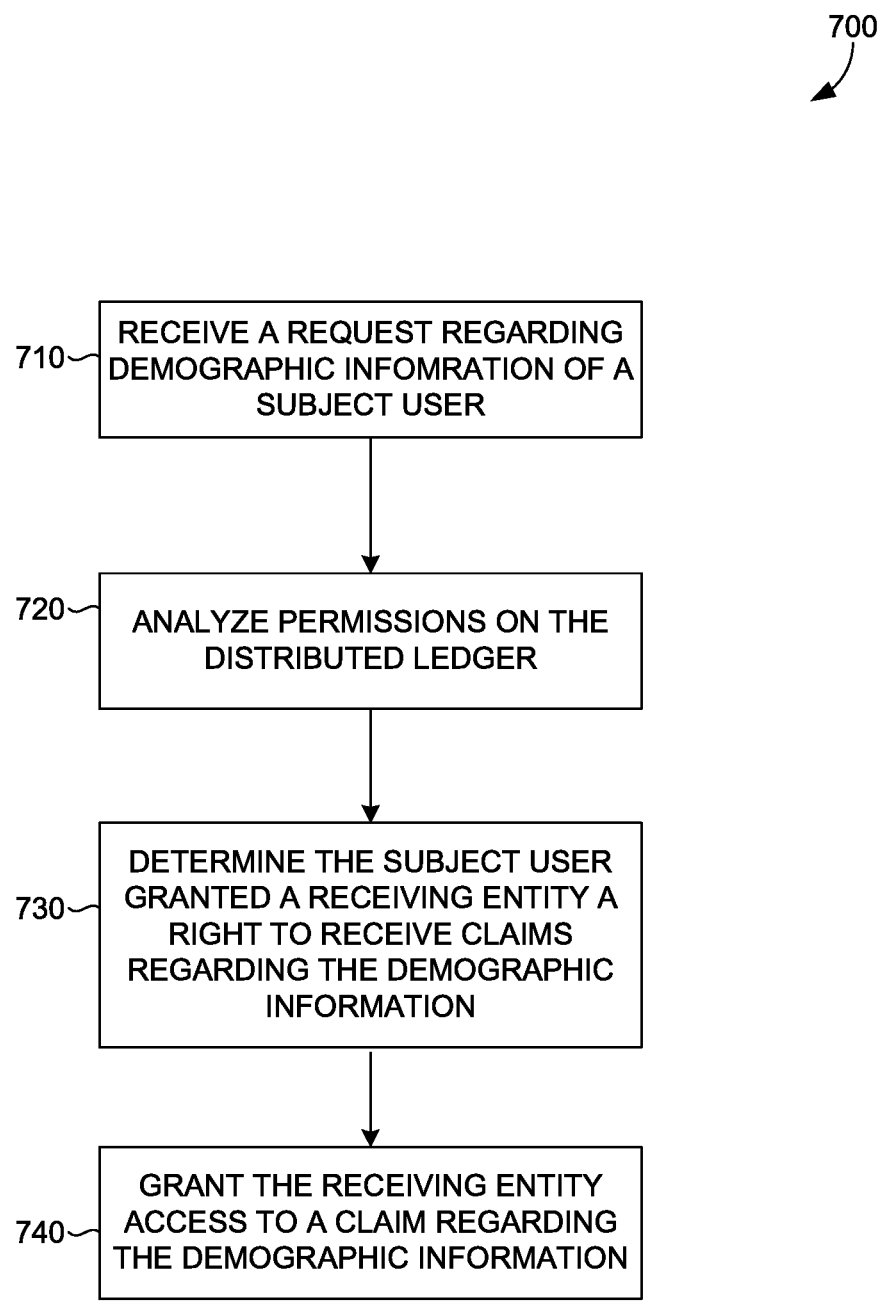
FIG. 7 is a flow diagram showing a method for facilitating sharing of data between entities in accordance with some embodiments of the present invention.

Referring now to FIG. 7, a flow diagram is provided showing an embodiment of a method 600 for facilitating sharing of data between entities. Method 700 is described with respect to node 110N by way of example. However, method 700 may be employed by any combination of entity systems 408A-408N (e.g., application(s) 428), user devices 402A-402N (e.g., application(s) 404A), and/or nodes 110A-110N (e.g., one or more smart contracts).

At block 710, method 700 includes receiving a request regarding demographic information of a subject user. For example, interface manager 510 of node 110N may receive a request of requests 536 that is for a claim that is responsive to an interrogatory, the interrogatory using values of items of demographic information regarding a subject user to produce the claim. The interrogatory may optionally be included in the request (e.g., as code, which may include one or more logical expressions involving one or more of the items), or identified from information included in the request. In some embodiments, the request is received by smart contract component 370, for example, as a digitally signed transaction directed to one or more smart contracts.

At block 720, method 700 includes analyzing permissions on a distributed ledger. For example, permissions determiner 512 of node 110N may based on the receiving of the request, analyze one or more permissions of permissions information 540 included in one or more digitally signed transactions (e.g., of one or more transaction blocks) on one or more copies of a distributed ledger maintained at least in part by one or more nodes of distributed ledger network 110. As an example, the one or more smart contracts may be triggered by the request (e.g., as a condition precedent) to perform the analysis.

At block 730, method 700 includes determining the subject user granted a receiving entity a right to receive claims regarding the demographic information. For example, based on the analyzing of the one or more permissions, permissions determiner 512 of node 110N may determine the one or more permissions represents the subject user granting a receiving entity (e.g., that provided the request or is identified by the request) with a right to receive claims that are responsive to interrogatories that use the values to produce the claims, the values being owned by the subject user. This may be based on determining the request conforms to any of the various criteria which may be specified by the one or more permissions.

At block 740, method 700 includes granting the receiving entity access to a claim regarding the demographic information. As an example, access provider 522 of node 110N may based on the determining, grant the receiving entity access to the claim. This may include, for example, the one or more smart contracts encrypting the claim using a key (e.g., public key) associated with the receiving entity (e.g., provided in the request).

Figure 8:
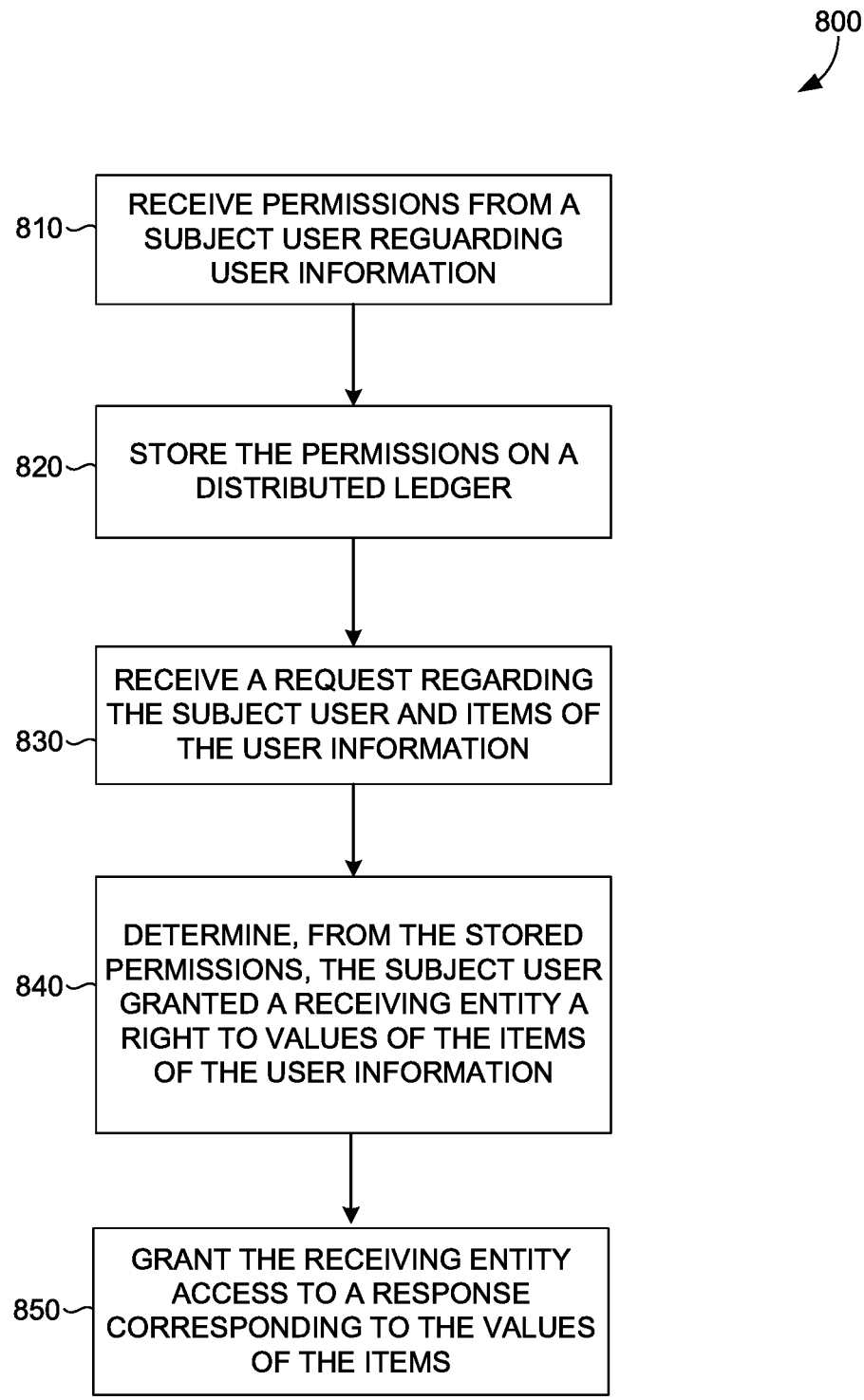
FIG. 8 is a flow diagram showing a method for facilitating sharing of data between entities in accordance with some embodiments of the present invention.

Referring now to FIG. 8, a flow diagram is provided showing an embodiment of a method 800 for facilitating sharing of data between entities. Method 800 is described with respect to entity system 408 110N by way of example. However, method 800 may be employed by any combination of entity systems 408A-408N (e.g., application(s) 428), user devices 402A-402N (e.g., application(s) 404A), and/or nodes 110A-110N (e.g., one or more smart contracts).

At block 810, method 800 includes receiving permissions from a subject user regarding user information. For example, interface manager 510 of entity system 408 may receive permissions from user device 402A. The permissions may be specified by the user via user input to a GUI provided using presentation manager 516 to application 404A. The permissions may be regarding entity information 418, which may be already stored in data storage unit 412, or may be provided with or in association with the permissions. In some embodiments, interface manager 510 of entity system 408 employs account data 420 associated with the subject user, such as to associate the permissions with the subject user, and/or to enable the subject user to provide the permissions.

At block 820, method 800 includes storing the permissions on the distributed ledger. For example, interface manager 510 of entity system 408 may store the permissions on the distributed ledger of distributed ledger network 110. This may include providing the permission to the distributed ledger in one or more digitally signed transactions. In some cases, this includes interface manager 510 digitally signing the one or more transactions.

At block 830, method 800 includes receiving a request regarding the subject user and items of the user information. For example, interface manager 510 of entity system 408 may receive a request of requests 536 from the distributed ledger, from another user via user device 404N via an application similar to application 404A, and/or from an entity associated with entity system 408N.

At block 840, method 800 includes determining, from the stored permissions, the subject user granted a receiving entity a right to values of the items of the user information. For example, interface manager 510 of entity system 408 may determine, from the stored permissions, the subject user granted a receiving entity a right to values of the items of the user information. The right may be to receive one or more of the values and/or one or more claims based on the values.

At block 850, method 800 includes granting the receiving entity access to a response corresponding to the values of the items. For example, access The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 9:
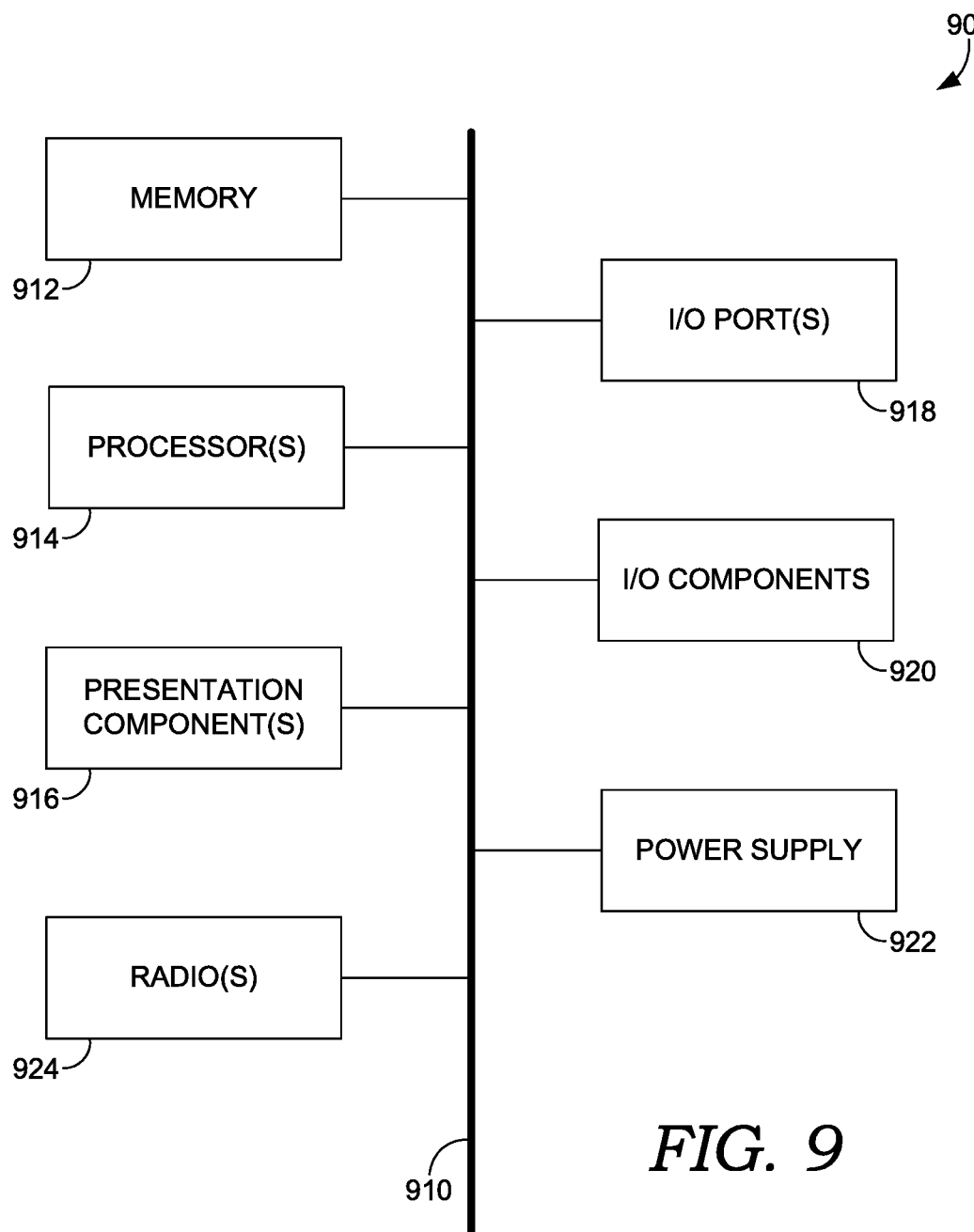
FIG. 9 is a block diagram of an example computing environment suitable for use in implementing some embodiments of the present invention.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an example computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Example presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, facilitating the sharing of data between entities using distributed ledger technology. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for controlling access to claims on user data, the method comprising:
  receiving, by at least one processor, a request identifying a logical expression involving items of interest and comprising a first entity identifier of a subject entity and a second entity identifier of a receiving entity, the request being from a client device associated with the receiving entity;
  based on the received request, searching, by the at least one processor and using the first entity identifier and the second entity identifier, digitally signed transactions stored on a distributed ledger for records of assignments of permissions by the subject entity to the receiving entity, wherein nodes of a distributed ledger system are configured to maintain the distributed ledger;
  determining, by the at least one processor, that the searched digitally signed transactions include a set of permissions that is associated with the subject entity and grants the receiving entity a right to receive a response to the request; and
  based on the determining, providing, by the at least one processor, a factual statement to the client device as the response, the factual statement corresponding to an output of the logical expression generated by applying values of the items of interest that are owned by the subject entity to variables of the logical expression that represent the items of interest, and evaluating the logical expression comprising the values applied to the variables to produce the output.

2. The method of claim 1, further comprising generating the factual statement, the generating comprising:
  decrypting entity data stored in association with the subject entity to produce the values; and
  applying the values to the logical expression to produce the factual statement.

3. The method of claim 1, wherein the providing of the factual statement includes providing a zero-knowledge proof to the receiving entity.

4. The method of claim 1, wherein the logical expression is included in the request and specifies a category and produces a logical value based on whether a value of the values identifies the subject entity as belonging to the category.

5. The method of claim 1, wherein the determining comprises determining a level of abstractness for an item of the items matches a level of abstractness granted by the subject entity.

6. The method of claim 1, further comprising:
  receiving, from the subject entity via user input to a graphical user interface, an assignment of the right to the receiving entity for at least one of the values; and
  based on the receiving of the assignment, recording at least one of the permissions in at least one of the digitally signed transactions on the distributed ledger.

7. The method of claim 1, wherein the request identifies the subject entity using the first entity identifier that is provided to the request based on a web browser loading a website associated with the receiving entity, and the determining identifies the set of permissions using the first entity identifier received from the request.

8. The method of claim 1, further comprising based on the providing of the factual statement, transferring a monetary value to the subject entity.

9. A non-transitory computer storage media storing computer-useable instructions that, when used by one or more computing devices, cause the one or more computing devices to perform a method comprising:
  in response to a received interrogatory that identifies a subject user and items of interest, identifying a set of permissions associated with the subject user in at least one digitally signed transaction stored on a distributed ledger, wherein the at least one digitally signed transaction records one or more assignments of the set of permissions by the subject entity to the receiving entity, and nodes of a distributed ledger system are configured to maintain the distributed ledger;

determining that the identified set of permissions grant the receiving entity a right to receive a response to the received interrogatory; and based on the determining, providing a factual statement corresponding to an output of a logical expression to the client device as the response, the factual statement corresponding to an answer to the received interrogatory that is derived from applying values of the items of interest that are owned by the subject user to variables of the logical expression that represent the items of interest, and evaluating the logical expression comprising the values applied to the variables to produce the output.

10. The computer storage media of claim 9, wherein the method further comprises generating the factual statement, the generating comprising:

decrypting entity data stored in association with the subject user to produce the values; and applying the values to the logical expression associated with the received interrogatory to produce the factual statement.

11. The computer storage media of claim 9, wherein the providing of the factual statement includes providing a zero-knowledge proof to the receiving entity.

12. The computer storage media of claim 9, wherein the received interrogatory comprises the logical expression that specifies a category and produces a logical value based on whether a value of the values identifies the subject user as belonging to the category, the factual statement being based on the logical value.

13. The computer storage media of claim 9, wherein the determining comprises determining a level of abstractness of an item of the items of interest matches a level of abstractness granted by the subject user for the right.

14. The computer storage media of claim 9, wherein the method further comprises:

receiving, from the subject user via user input to a graphical user interface, an assignment of the right to the receiving entity for at least one of the values; and based on the receiving of the assignment, recording at least one of the set of permissions in the at least one digitally signed transaction on the distributed ledger.

15. The computer storage media of claim 9, wherein the request identifies the subject user using an entity identifier of the subset user that is provided to the request based on a web browser loading a website associated with the receiving entity, and the set of permissions are identified using the entity identfier of the subset user received from the request.

16. A computer-implemented system for sharing data, comprising:

one or more processing units;

one or more memory devices storing instructions thereon that, when executed using the one or more processing units, cause the one or more processing units to execute operations comprising:

receiving a request identifying items of interest and a subject entity;

searching digitally signed transactions stored on a distributed ledger for permissions associated with the subject entity, wherein the digitally signed transactions record one or more assignments of the permissions by the subject entity to a receiving entity, and nodes of a distributed ledger system are configured to maintain the distributed ledger; and based on the permissions, providing a factual statement regarding the items of interest and the subject entity to the receiving entity as a response to the request, wherein the factual statement corresponds to an output of a logical expression, values of the items of interest that are owned by the subset entity are applied to variables of the logical expression that represent the items of interest, and the output is produced by evaluating the logical expression comprising the values applied to the variables.

17. The system of claim 16, wherein the providing of the factual statement includes storing on the distributed ledger a digitally signed transaction that includes the factual statement encrypted using a public key associated with the receiving entity.

18. The system of claim 16, wherein the providing of the factual statement is based on determining an amount of digital currency placed in escrow on the distributed ledger for the request.

19. The system of claim 16, wherein the request identifies the subject entity using an entity identifier that is provided to the request based on a web browser loading a website associated with the receiving entity, and the determining identifies the permissions using the entity identifier received from the request.

20. The system of claim 16, wherein the providing of the factual statement includes providing a zero-knowledge proof to the receiving entity.

* * * * *

UNITED STATES PATENT AND TRADEMARK OFFICE
CERTIFICATE OF CORRECTION

PATENT NO. : 10,984,410 B2  
APPLICATION NO. : 16/192743  
DATED : April 20, 2021  
INVENTOR(S) : Kevin Gary Smith et al.

Page 1 of 1

It is certified that error appears in the above-identified patent and that said Letters Patent is hereby corrected as shown below:

In the Claims

In Column 32, Line 4, Claim 15, delete "identfier" and insert -- identifier --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*